United States Patent
Notargiacomo et al.

(10) Patent No.: US 6,879,422 B2
(45) Date of Patent: Apr. 12, 2005

(54) METHOD OF ANALOG MODULATION AND OPTICAL EMITTER USING THIS METHOD

(75) Inventors: Massimo Notargiacomo, S. Agata sul Santerno (IT); Giuseppe Ravasio, Capriate San Gervasio (IT); Paolo Brambilla, Agrate Briaza (IT)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/169,273
(22) PCT Filed: Dec. 20, 2000
(86) PCT No.: PCT/EP00/13056
§ 371 (c)(1),
(2), (4) Date: Jun. 24, 2002
(87) PCT Pub. No.: WO01/48956
PCT Pub. Date: Jul. 5, 2001

(65) Prior Publication Data
US 2002/0191261 A1 Dec. 19, 2002

Related U.S. Application Data
(60) Provisional application No. 60/179,489, filed on Feb. 1, 2000.

(30) Foreign Application Priority Data
Dec. 24, 1999 (EP) .............................. 99830802

(51) Int. Cl.⁷ ............... G02F 1/00; G02F 1/07; G02F 1/01; H04B 10/00; H04B 10/04
(52) U.S. Cl. .............. 359/245; 359/237; 359/239; 398/157; 398/197
(58) Field of Search ................. 359/245, 239, 359/237, 161, 180, 181, 187, 188; 398/201, 197, 182, 157

(56) References Cited
U.S. PATENT DOCUMENTS
5,812,297 A * 9/1998 Mussino et al. ............ 359/181

* cited by examiner

*Primary Examiner*—Tim Thompson
(74) *Attorney, Agent, or Firm*—Moser, Patterson & Sheridan, L.L.P.

(57) ABSTRACT

Electro-optical modulator (100), comprising at least one electrical port (918, 919) and an input circuit (915, 916, 917) for the application of a modulating electrical signal to the said at least one electrical port. The said modulator also comprises a linear processing circuit (250) capable of generating a compensation signal. This linear processing circuit comprises a first terminal connected to the input circuit for taking a fraction of the said modulating electrical signal, at least one filtering element (2, 3) for eliminating predetermined spectral components from the said fraction of the modulating electrical signal, and at least one phase-shifting element (4, 6) for inverting the phase of the said fraction of the modulating electrical signal. The said linear processing circuit also comprises a second terminal capable of being connected to the said at least one electrical port for applying the compensation signal to the said electro-optical modulator.

13 Claims, 13 Drawing Sheets

METHOD OF ANALOG MODULATION AND OPTICAL EMITTER USING THIS METHOD

This application claims the benefit of Provisional Application No. 60/179,489 filed Feb. 1, 2000.

BACKGROUND OF THE INVENTION

1. Field of the Invention

The present invention relates to electro-optical modulators. In particular, the present invention relates to a method of analog modulation of an optical carrier signal according to an electrical modulating signal, and to an optical emitter which uses this method.

2. Description of the Related Art

An optical carrier signal can be modulated directly, by acting on the optical source, usually a laser, or indirectly, by means of an external optical modulator connected to the output of the optical source.

An example of an optical modulator which can be used for the amplitude modulation of an optical carrier signal with a modulating signal having a high frequency is an interferometer of the Mach-Zehnder type, constructed on lithium niobate ($LiNbO_3$).

A required characteristic of the external modulator is linearity of modulation, in other words the modulator must not distort the transmitted information.

The electro-optical characteristic (optical power as a function of the radio-frequency voltage) of modulators of the indicated type (the Mach-Zehnder interferometer) is typically non-linear. To limit the signal distortion, it is helpful to make the modulator operate in the vicinity of the portion of its characteristic that is as nearly linear as possible.

For this purpose, a modulating signal at radio frequency (RF) is applied to an RF port of an electro-optical modulator of the Mach-Zehnder interferometer type, and a direct-current voltage, in other words a bias signal, which determines the operating point, or bias point, of the modulator, is applied to the same port or to a suitable BIAS port.

An example of a modulator of this type is that marketed by the applicant under the symbol PIR PIM1510.

The modulating signal, applied to the RF input, consists, for example, of a sequence of bits of suitable amplitude.

In the case of a Mach-Zehnder modulator, the shape of the characteristic about to a sinusoid, and it is advantageous for the modulator to operate in the vicinity of the inflection point of the sinusoid when the operating point voltage $V_Q$ is applied.

The modulation characteristic of the Mach-Zehnder modulator, related to the operating point, can be expressed by the relation:

$$Pu = K_z \sin \beta$$

where:

Pu is the output optical power;

$K_z$ is a coefficient which depends on the characteristic of the Mach-Zehnder modulator;

$\beta = \pi V/V_\pi$ is the modulation index of the modulating signals, expressed in radians;

V is the variation of the applied voltage with respect to the operating voltage $V_Q$;

$V_\pi$ is a constant.

This characteristic with the sinusoidal shape is identified by two values:

the value of the voltage, called $V_\pi$, which represents the variation of voltage to be applied to the RF electrode to bring the output optical power from the maximum to the minimum value;

the value of the voltage $V_Q$ which has to be applied to the power supply electrode to make the operating point correspond to the inflection point of the characteristic with the sinusoidal shape, in other words with odd symmetry. In this case, the distortions of even order (including the second harmonic of the applied signals) and the distortions of odd order assume well-defined values.

For example, in the case of a Mach-Zehnder modulator of the type PIR PIM1510, produced by the applicant, the aforesaid voltages may assume the following values: $V_\pi$=4.3 V and $V_Q$=0.7 V.

The value of the voltage $V_Q$ of the operating point is not constant, but varies with time (as a result of the accumulation of static charges in the $LiNbO_3$, for example) and also with temperature.

Consequently, the operating voltage must be continuously adapted, on the basis of information such as the presence and size of the distortions of even order, in other words the intermodulation products of the second order.

Patent application EP 768 765 describes a method of controlling the operating point, or bias point, of an electro-optical modulator for CATV (community antenna television) systems. According to this method, an additional signal, called the pilot tone, having a frequency lower than the lower limit of the modulation signal band, is injected into the electro-optical modulator. The second harmonic of this pilot tone is detected at the output of the electro-optical modulator, and a bias signal is generated according to the sign and amplitude of this harmonic.

In the article "Quasi-feed-forward linearization of electro-optic modulators for analog signal transmission" by D. Davidson et al., Optical Engineering, vol. 32, No. 4, Apr. 1993, the authors describe a linearization, known as a "quasi-feed-forward" linearization, used for electro-optical modulators of the Mach-Zehnder type, used in the analog modulation of optical signals for CATV systems.

The linearization system described in the article requires the use of two Mach-Zehnder modulators, EOM1 and EOM2. A fraction of a radio-frequency signal is applied to the modulator EOM1. The optical signal leaving the modulator EOM1 is applied, after conversion to an electrical signal and a 180° phase shift, to the modulator EOM2. Another fraction of the radio-frequency signal is applied directly to the modulator EOM2. The electrical signal applied to the modulator EOM2 consists of the original radio-frequency signal plus the distortion products generated by the modulator EOM1, phase-shifted by 180°. This system substantially pre-distorts the radio-frequency electrical signal to be injected into the modulator EOM2, using an electro-optical modulator EOM1.

In general, in WDM (wavelength division multiplexing) optical transmission systems, Mach-Zehnder modulators are used to modulate an optical carrier having a wavelength contained in a low-attenuation window of the optical fibres with a modulating signal with which is associated the information to be transmitted.

Patent application EP 98117898.1 describes an optical transmission system for 128 channels, comprising 128 wavelength converters.

Each of these wavelength converters comprises a photodiode for receiving an optical signal generated by an external source, and for converting it to an electrical signal; a laser for generating a fixed-wavelength optical carrier; and an electro-optical modulator, such as a Mach-Zehnder modulator, for modulating this carrier with the said electrical signal. These converters can be used to convert an optical signal having a certain wavelength to a signal having a predetermined wavelength and then to re-transmit it.

In the field of communications, and particularly in the field of optical communications, there are various known information transmission protocols, such as SONET (Synchronous Optical Network), ATM (Asynchronous Transfer Mode), SDH (Synchronous Digital Hierarchy), and IP (Internet Protocol).

For example, in a digital optical communications system using the SDH-STM-16 protocol, the data signal requires a sequence of binary digits (bits) having a bit rate $r_b$=2.488 Gbit/s, generated by time division multiplexing of further sequences of binary digits at lower frequency. This sequence is associated with code words which represent the information, and have a length M (number of bits contained in the word).

Additionally, this signal is obtained by means of a masking, or "scrambling", operation, which makes it possible to create a sequence of bits having a spectral content distributed uniformly along the frequency axis, in other words without clustering in particular bands, in which the probability that there will be bits equal to 1 is equal to the probability that there will be bits equal to 0.

The spectrum of this signal is discrete and has spectral lines spaced apart by the frequency of repetition of the word, in other words by the distance $r_b/M$.

Standards ITU-T-925 and ITU-T-803 (International Telecommunications Union) contain, respectively, the standards for the SDH-STM-16 protocol and those for the corresponding optical signal.

The word which has actually been transmitted is discriminated from the set of specified possible words at a suitable receiver present in the transmission system.

Because of various noise factors, there is a probability of error in the receiver, in other words the probability of incorrect discrimination of the transmitted word may be significant.

A method used in optical communication systems to minimize this probability of error is that called "forward error correction" (FEC), according to which additional data, containing codes for identifying and correcting the error, are associated with the signal to be transmitted. For example, one error identification bit is inserted for about every 16 bits of the data signal.

At the point of reception, a suitable FEC decoder identifies the errors which have occurred during transmission and corrects them.

The introduction of the error codes results in an increase of the bit rate $r_b$: for example, for an SDH signal having a bit rate $r_b$=2.488 Gb/s, the bit rate is changed to $r_{bFEC}$=2.666 Gb/s.

For generating an SDH signal with FEC, a further scrambling operation is carried out according to an FEC code word having a length of $M_{FEC}$, equal to $2^{13}-1$ for example.

The spectrum of the SDH signal with FEC has lines spaced apart by a quantity equal to $r_{bFEC}/M \, M_{FEC}$.

SUMMARY OF THE INVENTION

For the purposes of the present invention, the expression "a first amplitude spectrum reproduces a second amplitude spectrum" means that the first amplitude spectrum shows a shape, such as the shape of the spectral components in a given frequency band, which is substantially identical to that of the second spectrum, except for a gain factor.

Additionally, for the purposes of the present invention, the "linear processing of a signal" is taken to mean any operation carried out on the basis of this signal, such as filtering, attenuation, amplification, phase shifting or a combination of these operations, such that no significant spectral components are generated in addition to those initially present in the signal.

For the purposes of the present invention, the expression "to eliminate a first signal or a first spectrum from a second signal or from a second spectrum" means to attenuate the amplitude of the said first signal by a predetermined amount with respect to that of the second signal.

The applicant has observed that the output signal of an electro-optical modulator obtained in the presence of an additional external signal, such as the aforesaid pilot tone, which modulates the optical carrier signal, may become superimposed on a background noise.

In particular, for electro-optical modulators which use a pilot tone for controlling the operating point, the background noise, in which the signal to be detected, such as the second harmonic component, is submerged, may cause fluctuations in amplitude of the bias signal or even the saturation of some stages of the control system with consequent instability of the operating point of the electro-optical modulator.

In addition, the applicant has surprisingly discovered that this background noise is correlated with the modulating signal itself, and, in particular, has an amplitude spectrum which reproduces the amplitude spectrum of the modulating signal contained in the same frequency band. This background noise is present even if those spectral components which are located in the frequency band to which the additional external signal is allocated, or which contains the corresponding optical signal to be detected at the output to determine the bias signal, are eliminated from the modulating signal before its application to the electro-optical modulator.

The applicant considers that the presence of this background noise may be due to beats, particularly odd-order beats, which occur in the electro-optical modulator between certain spectral components of the modulating signal.

The applicant has discovered a method for reducing a background noise present in the frequency band of an output signal of an electro-optical modulator used, after an optical-electrical conversion, to generate a bias signal for the said modulator.

This method provides for the generation of a compensation signal formed by processing a fraction of the modulating signal applied to the electro-optical modulator. The compensation signal is obtained by filtering the modulating signal, to eliminate the spectral components found in a frequency band outside the band of the noise, and by inverting its phase. This compensation signal reproduces the spectrum of the background noise and has a phase of opposite sign.

The applicant has discovered that, by applying the compensation signal to the electro-optical modulator, through the RF port of the modulator for example, in parallel with the modulating electrical signal, the background noise present in the optical signal at the output of the electro-optical modulator can be significantly reduced. The applicant considers that this is explained by the fact that, when the compensation signal is applied to the electro-optical modulator, it interacts with the modulated optical signal to carry out a further amplitude modulation of the said signal. The compensation signal has the same amplitude as the noise and an opposite phase to it, and consequently this further amplitude modulation results in an attenuation of the noise present in the modulated optical signal.

The applicant has also discovered that the background noise, which, as stated above, is correlated with the modulating signal, can be attenuated significantly by making the compensation signal interact directly with the electrical signal obtained by the optical-electrical conversion of a fraction of the modulated optical signal from which the bias signal of the modulator is formed. In this case, the compensation signal, having the same amplitude as, and the opposite phase to, the noise, is added to this electrical signal, for example by means of an electrical adding node.

In a first aspect, the present invention relates to an externally modulated optical emitter, comprising:
- an optical source capable of generating an optical carrier signal;
- an electro-optical modulator capable of receiving a modulating electrical signal and a bias signal, the modulator comprising:
  - an optical input for an optical carrier signal generated by the said source,
  - at least one electrical input,
  - an optical output for a modulated optical signal;
- an optical-electrical receiver coupled to the said optical output, capable of converting at least a portion of modulated optical signal into an electrical feedback signal and of making it available at an electrical output;
- a circuit for controlling the operating point of the electro-optical modulator, connected to the said output of the optical receiver for generating the said electrical bias signal from the said electrical feedback signal;
- a compensation circuit for generating a compensation signal capable of interacting with the modulated optical signal, the said compensation circuit comprising:
  - an input terminal for taking a fraction of the said modulating electrical signal before it is supplied to the said electrical input,
  - at least one phase-shifting element connected to the said input terminal to invert the phase of the said fraction of the modulating electrical signal,
  - an output terminal capable of being connected to the said at least one electrical input, to obtain an interaction of the compensation signal with the said modulated optical signal.

Preferably, the said compensation circuit comprises at least one filtering element for eliminating predetermined spectral components from the said fraction of the modulating electrical signal. In particular, the said at least one filtering element is capable of eliminating from the said fraction of the modulating electrical signal the spectral components located in a frequency band external to the band of the said noise. More particularly, the said at least one filtering element comprises a low-pass filter. Preferably the said low-pass filter has a cut-off frequency of 10 kHz.

Advantageously, the said compensation circuit comprises an amplifier stage for the said compensation signal.

Preferably, the said at least one electrical input comprises a first port for the application of the said modulating electrical signal.

Preferably, the said at least one electrical input comprises a second port for the application of the said bias signal.

Advantageously, the said optical emitter also comprises an input circuit located between the said generator of the modulating electrical signal and the said first port.

Preferably, the said input circuit comprises at least one high-pass filter for eliminating the low-frequency components of the modulating electrical signal. More preferably, the said high-pass filter has a cut-off frequency of 30 kHz.

Advantageously, the said input circuit comprises at least one amplifier stage for amplifying the modulating electrical signal.

Preferably, the said electro-optical modulator comprises a Mach-Zehnder interferometer. More preferably, the said electro-optical modulator comprises an integrated Mach-Zehnder interferometer on a lithium niobate substrate.

Preferably, the said optical source comprises a semiconductor laser. More preferably, the said optical source is capable of emitting an optical beam at a wavelength in the range from 1520 nm to 1602 nm.

Preferably, the said modulating electrical signal has a spectrum comprising components spaced apart by frequency intervals of less than 300 Hz. More preferably, the said modulating electrical signal has a spectrum comprising components spaced apart by frequency intervals of less than 38 mHz.

In particular, the said modulating electrical signal comprises a digital signal having a bit rate of more than 2.488 Gb/s. Alternatively, the said modulating electrical signal comprises a digital signal having a bit rate of more than 2.666 Gb/s.

Advantageously, the said modulating electrical signal comprises a digital signal having a word length greater than or equal to $2^{10}$.

In a second aspect, the present invention relates to an externally modulated optical emitter, comprising:
- an optical source capable of generating an optical carrier signal;
- an electro-optical modulator capable of receiving a modulating electrical signal and a bias signal, the said modulator comprising:
  - an optical input for an optical carrier signal generated by the said source,
  - at least one electrical input,
  - an optical output for a modulated optical signal;
- an optical-electrical receiver coupled to the said output and capable of converting at least a portion of modulated optical signal to an electrical feedback signal and of making it available at an electrical output;
- a circuit for controlling the operating point of the electro-optical modulator, connected to the said output of the optical receiver for generating the said electrical bias signal from the said electrical feedback signal;
- a compensation circuit for generating a compensation signal capable of interacting with the modulated optical signal, the said compensation circuit comprising:
  - an input terminal for taking a fraction of the said modulating electrical signal before it is supplied to the said electrical input,
  - at least one phase-shifting element connected to the said input terminal to invert the phase of the said fraction of the modulating electrical signal,
  - an output terminal capable of being connected to the said at least one electrical output of the optical receiver, to obtain an interaction between the compensation signal and the said electrical feedback signal.

A third aspect of the present invention relates to a method for generating a modulated optical signal where an optical carrier signal is supplied to an electro-optical modulator, comprising the steps of
a) supplying a modulating electrical signal to the said modulator to obtain the modulated optical signal, b) supplying an electrical drive signal to the said modulator, in such a way as to generate at the output of the said modulator an optical feedback signal, the said optical feedback signal being capable of incorporating a noise correlated with the modulating electrical signal, c) generating, from the said optical feedback signal, an electrical bias signal capable of biasing the modulator at an operating point dependent on the said feedback signal, d) processing at least one fraction of the said modulating electrical signal to obtain a compensation signal whose phase is inverted with respect to that of the modulating electrical signal, e) causing an interaction between a signal obtained from the said modulated optical signal and the said compensation signal to attenuate the said noise in the electrical feedback signal in such a way that the electrical bias signal is independent of the shape of the said noise.

Advantageously, the said processing step is a linear processing of the said at least one fraction of the modulating electrical signal.

Preferably, the said interaction step comprises a step of supplying the said compensation signal to the said electro-optical modulator in such a way as to cause an interaction with the modulated optical signal. In a first embodiment of the said method, the interaction step comprises a step of supplying the said compensation signal to an input for bias signals of the said electro-optical modulator. In a second embodiment of the said method, the interaction step comprises a step of supplying the said compensation signal to an input for radio-frequency signals of the said electro-optical modulator.

Alternatively, the said interaction step comprises a step of converting the said optical feedback signal to an electrical feedback signal. Preferably, the said interaction step comprises a step of adding the said compensation signal to the said electrical feedback signal. Advantageously, the said interaction step comprises a step of modifying the amplitude of the said compensation signal in a way which is correlated with the amplitude of the electrical feedback signal. Preferably, the said step of modifying comprises a step of multiplying the said compensation signal in an analog way by the temporal mean of the electrical feedback signal.

Advantageously, the said interaction step comprises an attenuation of the amplitude of the said noise by at least 10 dB. Preferably, the said interaction step comprises an attenuation of the amplitude of the said noise by at least 20 dB.

Preferably, the said processing step comprises a step of eliminating a portion of the spectrum of the modulating electrical signal.

Advantageously, the said processing step comprises at least one step of amplifying the amplitude of the said at least one fraction of the modulating electrical signal.

Preferably, the said step of supplying an electrical drive signal to the said electro-optical modulator comprises supplying a tone at a predetermined frequency to an input for bias signals of the said modulator.

In a fourth aspect, the present invention relates to a method for generating a signal having a first predetermined frequency band, comprising the steps of:

a) supplying an optical carrier signal to an optical modulator, b) generating a modulating electrical signal with which are associated a first spectrum in the said first band and a second spectrum in a second frequency band, c) supplying the said one part of the modulating electrical signal contained in the first band to the said optical modulator to generate a modulated optical signal capable of having a spectrum in the said first and second bands, d) taking at least one fraction of the said modulating electrical signal, e) linearly processing the said at least one fraction to obtain a compensation signal contained in the said second band, f) causing an interaction between a signal obtained from the said modulated optical signal and the said compensation signal, g) selecting the relative phases of the said interacting signals in such a way as to attenuate the said second spectrum of the modulated optical signal.

In a fifth aspect, the present invention relates to an electro-optical modulator comprising at least one electrical port for the application of electrical signals, an input circuit for the application of a modulating electrical signal to the said at least one electrical port, a linear processing circuit capable of generating a compensation signal, having a first terminal connected to the said input circuit for taking a fraction of the said modulating electrical signal, the said linear processing circuit comprising at least one filtering element for eliminating predetermined spectral components from the said fraction of the modulating electrical signal, at least one phase-shifting element for inverting the phase of the said fraction of the modulating electrical signal, a second terminal capable of being connected to the said at least one electrical port for applying the compensation signal to the said electro-optical modulator.

The present invention makes it possible to improve the stability of the circuit for controlling the operating point of an electro-optical modulator.

The present invention also permits the use of digital modulating signals having a bit rate $r_b$ and word length M corresponding to spectral components which are very close together in respect of frequency, without compromising the stability of the operating point of the modulator.

Because of the reliability of the control of the operating point achieved by means of the present invention, the performance of the circuit elements contained in the circuit for controlling the said operating point becomes less critical.

BRIEF DESCRIPTION OF THE DRAWINGS

Further advantages and characteristics of the invention will be made clearer by the following description of some examples of embodiment, provided without restrictive intent, and illustrated in the attached figures, in which.

DETAILED DESCRIPTION

Figure 1:
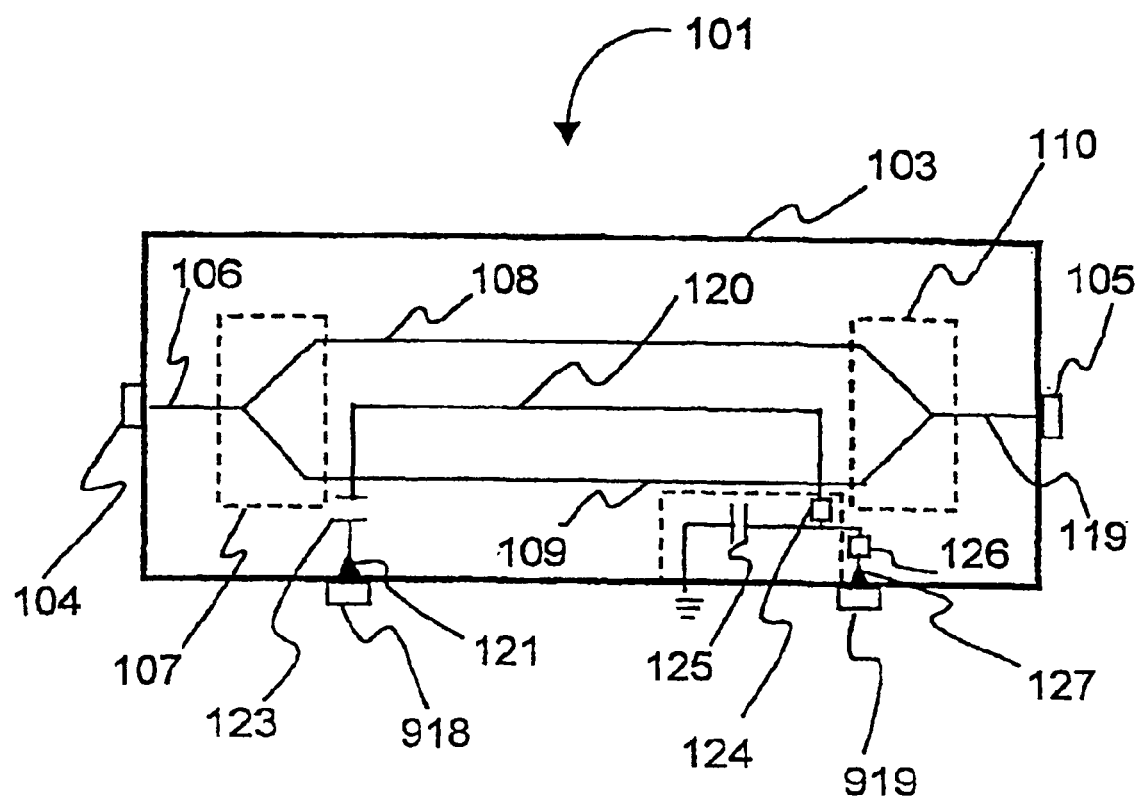
FIG. 1 shows schematically an electro-optical modulator.

An electro-optical modulator 101 for the amplitude modulation of an optical carrier signal, suitable for use in the present invention, is shown schematically in FIG. 1.

The electro-optical modulator 101, of the Mach-Zehnder type, comprises a substrate 103 of crystalline material such as lithium niobate, an optical input 104, a radio-frequency (RF) port 918, a bias port 919, and an optical output 105.

The substrate 103 comprises an optical waveguide 106, connected to the optical input 104, followed by an optical splitter 107 whose outputs are connected to an optical waveguide 108 and to an optical waveguide 109.

The optical waveguides 108 and 109 are connected to two inputs of an optical coupler 110 connected by means of an optical waveguide 119 to the optical output 105.

The optical waveguides 106, 108, 109, 119, the optical splitter 107 and the optical coupler 110 are formed by known methods, such as the diffusion of a metal (for example titanium) into the crystalline substrate.

The optical splitter 107 is capable of separating an optical beam present at its input into two beams, of equal power for example, and of sending them along two optical output guides, while the optical coupler 110 is capable of combining two optical beams present in two optical input guides along a single output waveguide.

However, the optical modulator 101 is symmetrical, and the functions of the optical splitter 107 and of the optical coupler 110 can be interchanged.

An electrical structure is also formed on the substrate 103, by deposition of a metal for example, and comprises a radio-frequency (RF) electrode 121 connected to the RF port 918, followed by a hot electrode 120, located in the region of the substrate 103 delimited by the optical waveguides 108 and 109, and a terminal portion 122.

The RF electrode 121 comprises a protective capacitor 123, preferably integrated in the substrate, capable of blocking the continuous component of an electrical bias signal applied to the bias port 919, which might damage a circuit external to the modulator (not shown in FIG. 1) which drives the RF electrode 121. For example, this capacitor has a cut-off frequency $f_t=60$ kHz. Typically, this drive circuit of the RF electrode 121 may be damaged by direct-current voltages of more than 4–5 V.

Other filters, such as a plurality of capacitors connected in parallel, may be used as alternatives to the capacitor 123.

The terminal portion 122 comprises a capacitor 125 connected to earth and a resistor 124, both preferably integrated in the substrate. The resistor 124 has a resistance such as to ensure the impedance matching of the transmission line comprising the radio-frequency electrode 121, the hot electrode 120 and the terminal portion 122, in such a way that a modulating electrical signal is propagated along this line in progressive wave conditions.

The hot electrode 120 is connected, by means of a resistor 126 and the resistor 124, to a BIAS electrode 127. The resistance of this resistor 126 is such that an open circuit is formed for the modulating electrical signal propagated along the hot electrode 120 up to the earth connection via the capacitor 125.

The BIAS electrode 127 is suitable for the propagation, from the BIAS port 919 to the hot electrode 120, of a direct-current bias signal, capable of determining the operating point of the electro-optical modulator 101. On this point, it should be noted that the capacitor 125 has a capacitance such that it forms an open circuit for the bias signal.

The electro-optical modulator of FIG. 1 also comprises two earth electrodes (not shown in the figure), produced, for example, by deposition of metal on the crystalline substrate. The two earth electrodes can be positioned on the two substrate areas symmetrically opposite the region lying between the optical waveguides 108 and 109.

An optical carrier signal applied to the optical input 104 is propagated by the optical waveguide 106 towards the optical splitter 107.

The optical splitter 107 separates the optical carrier signal into two beams which are propagated along the optical waveguides 108 and 109.

The optical coupler 110 combines the said optical beams and transmits the resulting signal along the optical waveguide 119 and then towards the optical output 105.

The modulating electrical signal which is applied to the RF port 918, and which has its low-frequency components and direct-current component removed by the blocking action of the capacitor 123, and the bias signal applied to the BIAS port 919 are transmitted to the hot electrode 120, generating a variable electrical field. The optical waveguides 108 and 109, owing to their arrangement with respect to the hot electrode 120, are subjected to the action of electrical fields of equal intensity but of opposite sign, which, by the electro-optical effect, induce variations of opposite sign in the refractive indices of the said waveguides.

These variations of the refractive index modify the velocity of propagation of the optical beams which travel in the optical waveguides 108 and 109.

Consequently, the optical beams propagated in the said guides 108 and 109 have a phase shift due to the presence of the modulating electrical signal and the bias signal.

These beams interfere in the coupler 110, and the resulting optical signal, which is propagated from the optical waveguide 119 towards the optical output 105, has an intensity which varies according to the variation of the modulating electrical signal.

Figure 3:
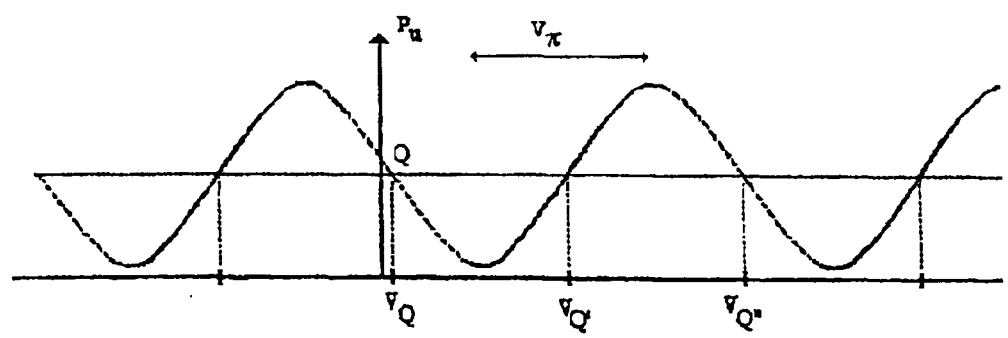
FIG. 3 shows the input-output characteristic of the electro-optical modulators of FIGS. 1 and 2.

FIG. 3 shows the input-output characteristic, with a sinusoidal shape, of the electro-optical modulator 101, and shows in particular the shape of the output power $P_u$ as a function of the voltage applied to the modulator.

FIG. 3 shows the optimal point Q of voltage $V_Q$ corresponding to an inflection point of the input-output characteristic, in the vicinity of which the modulator has a virtually linear behaviour.

A bias signal having the voltage $V_Q$, applied to the BIAS port 919, causes the electro-optical modulator 101 to operate at the optimal operating point Q.

FIG. 3 also shows the amplitude of the voltage $V_\pi$, defined above, and the voltages $V_Q'$, $V_Q''$ corresponding to other inflection points of the characteristic.

Figure 2:
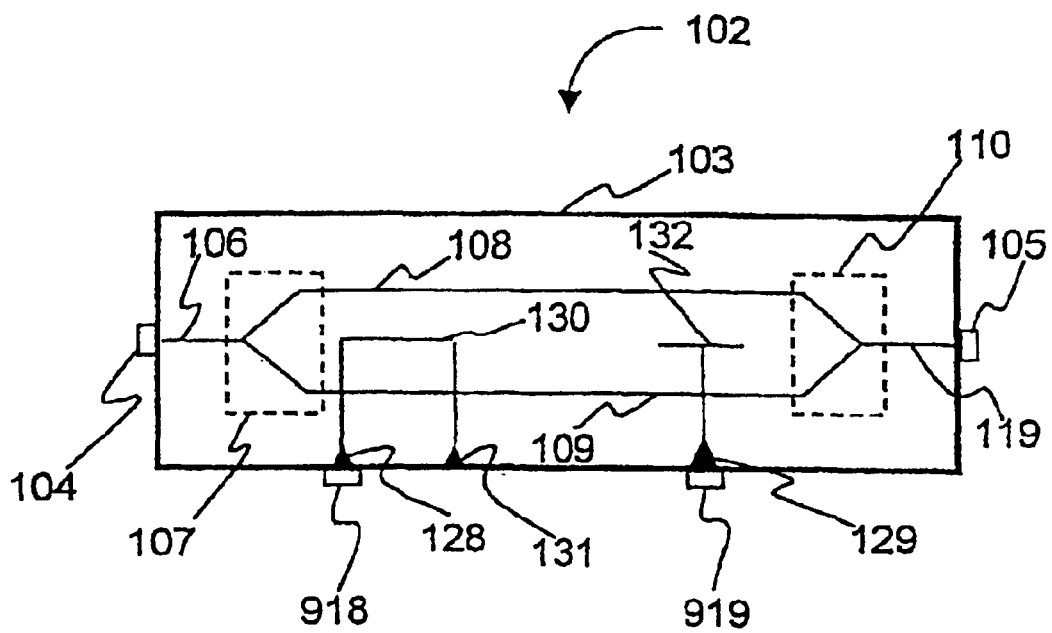
FIG. 2 shows schematically an alternative electro-optical modulator to that of FIG. 1.

An electro-optical modulator 102 which is an alternative to the modulator 101 is shown schematically in FIG. 2, in which the same numerical references are used to represent similar elements.

This electro-optical modulator 102 comprises an RF electrode 128 connected to the RF port 918, and a BIAS electrode 129 connected to the bias port 919.

The RF electrode 128 is connected to a hot electrode 130, which extends in the region lying between the optical waveguides 108 and 109, and a termination 131.

The BIAS electrode 129 is connected electrically to an electrode 132 lying in the region of the substrate delimited by the optical waveguides 108 and 109.

It should be noted that, in this alternative embodiment, the RF electrode 128 does not have any integrated protective capacitors, such as the capacitor 123 used in the electro-optical modulator 101.

The use of the modulator 102 is advantageously accompanied by the use of protective capacitors (not shown) external to the modulator and placed at the input to the RF port 918.

The operation of the modulator 102 is similar to that described with reference to the modulator 101 and is evident to a person skilled in the art.

Figure 4:
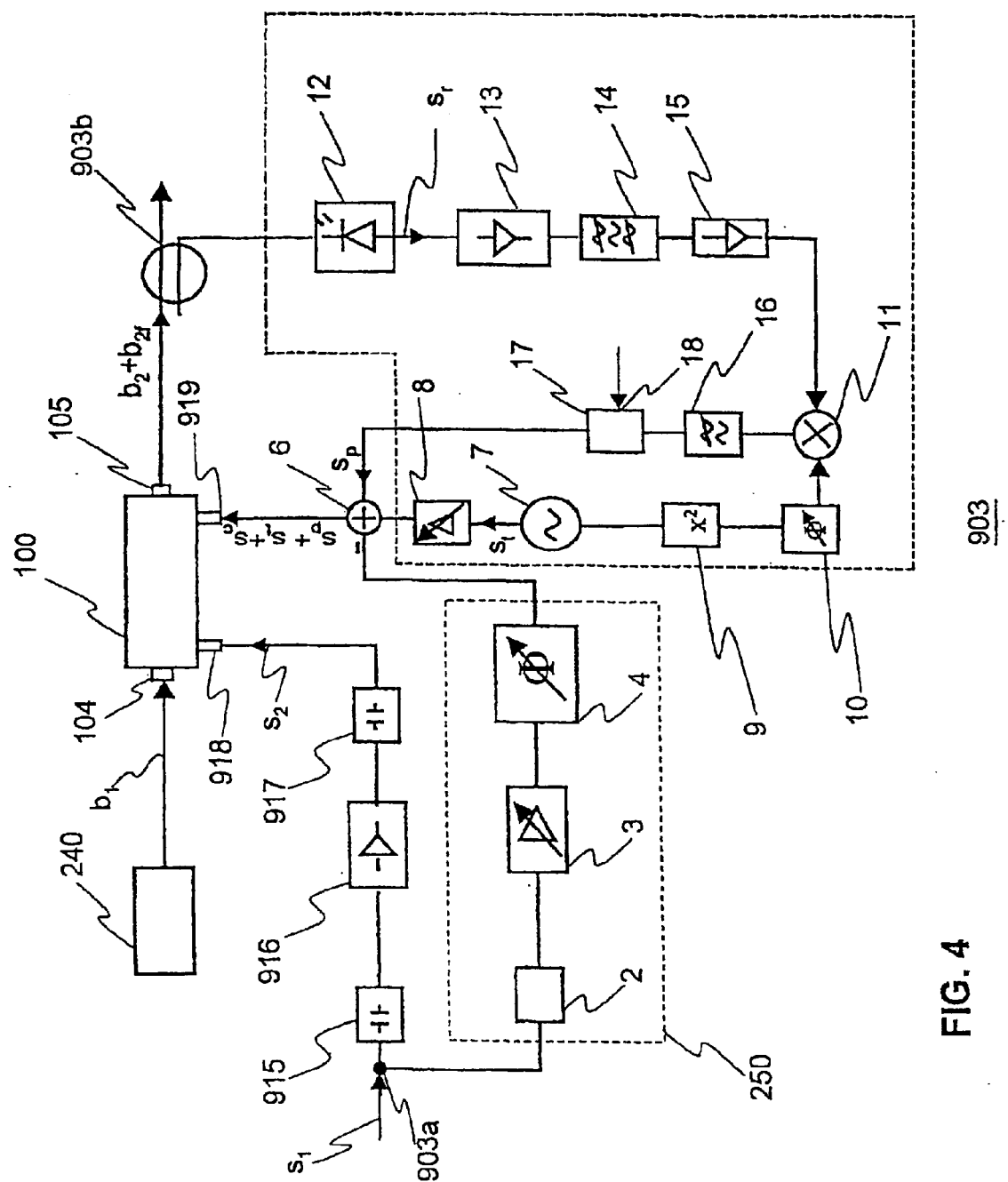
FIG. 4 shows a diagram of a first preferred embodiment of an externally modulated optical emitter according to the present invention.

The block diagram in FIG. 4 represents a preferred embodiment of an externally modulated optical emitter 903 constructed according to the present invention.

The said optical emitter 903 comprises a bias point control circuit 200 capable of injecting a drive signal (pilot tone) at a frequency of $f_1$ into an electro-optical modulator 100 and of detecting an even harmonic of the signal, for example the second harmonic at the frequency $2f_1$, at the output of the said modulator.

The control circuit 200 is also capable of generating a bias signal which causes the electro-optical modulator 100 to operate at an operating point corresponding to a minimum value of the amplitude of the second harmonic which is detected, in other words in a linear region of its transmission characteristic.

The optical modulator 100 is preferably of the type described with reference to FIG. 1 or alternatively of the type shown in FIG. 2. Mach-Zehnder modulators of other types are also suitable.

A radiation source 240, capable of generating an optical carrier signal, is connected, by a polarization maintaining optical fibre for example, to an optical input 104 of the modulator 100. This source 240 can be a laser, particularly a semiconductor laser.

The number 903a indicates an input for radio-frequency modulating electrical signals.

The input 903a is connected by means of a first decoupling capacitor 915, with a capacitance of $C_1$, to an amplifier stage 916.

The output of the amplifier stage 916 is connected by means of a second decoupling capacitor 917, with a capacitance of $C_2$, to the RF port 918 of the electro-optical modulator 100.

The first and second decoupling capacitors 915 and 917 have a cut-off frequency such that they eliminate the direct-current component of a modulating electrical signal present at the input 903a, which would damage the amplifier stage 916 and the electro-optical modulator 101.

Advantageously, the first and second decoupling capacitors 915 and 917 also eliminate the low-frequency components of the modulating signal which occupy a frequency band comprising the frequency $f_1$ and the double frequency $2f_1$.

For example, in the case of a pilot tone having a frequency of about 1 kHz, corresponding to a second harmonic of about 2 kHz at the output, for an amplifier stage 916 having an input impedance of 50 Ω, suitable values of the capacitances $C_1$ and $C_2$ of the said decoupling capacitors are $C_1=C_2=100$ nF.

According to these values given by way of example, the circuit comprising the first decoupling capacitor 915, the amplifier stage 916, and the second decoupling capacitor 917 has a cut-off frequency $f_t$ of about 30 kHz.

Other high-pass filters of known types can be used as alternatives to the decoupling capacitors 915 and 917.

Additionally, if an electro-optical modulator of the type 101 in FIG. 1 is used, the cut-off at low frequencies is also carried out within the said modulator by the protective capacitor 123.

The input 903a for modulating electrical signals is also connected to a compensation circuit 250.

This compensation circuit 250 comprises a high-pass filter 2, such as a known RC filter, capable of substantially eliminating only the direct-current component of the modulating signal. The high-pass filter 2 is connected to a high-impedance variable-gain amplifier stage 3 capable of eliminating the medium- and high-frequency components of the modulating signal.

For example, the high-pass filter 2 can consist of a resistor having a resistance R=1 kΩ and a capacitor having a capacitance C=1 μF, corresponding to a cut-off frequency of 159 Hz.

Preferably, the amplifier stage 3 not only provides suitable amplification, but also acts, as a high-pass filter, in such a way as to eliminate the spectral components above about 10–20 kHz.

The amplifier 3 is connected by means of an optional phase shifter 4 to a subtraction input 5 of an adding node 6.

The BIAS port 919 of the electro-optical modulator 100 is designed for the input of a bias signal by means of which the operating point of the modulator is determined.

The bias point control circuit 200 comprises an oscillator 7 suitable for generating an electrical signal at the frequency $f_1$, connected by a first output to a variable attenuator 8.

A second output of the oscillator 7 is connected to a frequency doubler 9 capable of doubling the frequency of the signal at its input.

The output of the frequency doubler 9 is connected by means of a variable phase shifter 10 to a first input of an analog multiplier 11.

An optical output 105 of the electro-optical modulator 100 is optically connected to an optical splitter 230, capable of separating the radiation arriving from the modulator 100 in such a way that it sends part of it, preferably in the range from 80% to 99%, and more preferably in the range from 90% to 99%, to an optical output 903b, and the remaining part to an optical receiver 12, comprising a photodiode for example.

The optical splitter 230 is, for example, of the fused fibre or planar waveguide type or, alternatively, a beam splitter in free space.

The optical receiver 12 is connected by its electrical output to an amplifier stage 13 and then to a bandpass filter 14 centred on the frequency $2f_1$.

The output of the bandpass filter 14 is connected by an amplifier stage 15 to a second input of the said analog multiplier 11.

The analog multiplier 11 is capable of carrying out the coherent detection of the signal at the frequency $2f_1$ arriving from the optical receiver 12, using the output signal of the oscillator 7 whose frequency is doubled by the doubler 9. The variable phase shift 10 is adjusted in such a way as to optimize the coherent detection in the analog multiplier 11.

The output of the analog multiplier 11 is connected, by means of a low-pass filter 16 which substantially only allows the passage of the direct-current component of the signal which is detected, to an input of a differential amplifier 17. Preferably, the low-pass filter 16 has an upper cut-off frequency of the order of a few hertz.

Another input of the differential amplifier 17 is used for the application of a reference signal for the biasing 18. The differential amplifier 17 is capable of supplying at its output the bias signal for the electro-optical modulator 100.

The output of the differential amplifier 17 is connected electrically to an input of the adding node 6.

Both the optical connections and the electrical circuits relating to the functional units which make up the device of FIG. 4 can be constructed by known methods.

The device 903 of FIG. 4 operates in the following manner.

An optical carrier signal $b_1$, having a given wavelength, emitted by the radiation source 240, is injected into an optical port 104 of the electro-optical modulator 100.

A first modulating electrical signal $s_1$ is supplied to the input 903a.

This first modulating electrical signal $s_1$ can be a sequence of bits having a bit rate $r_b$, encoded in such a way that the word length is M.

Figure 5:
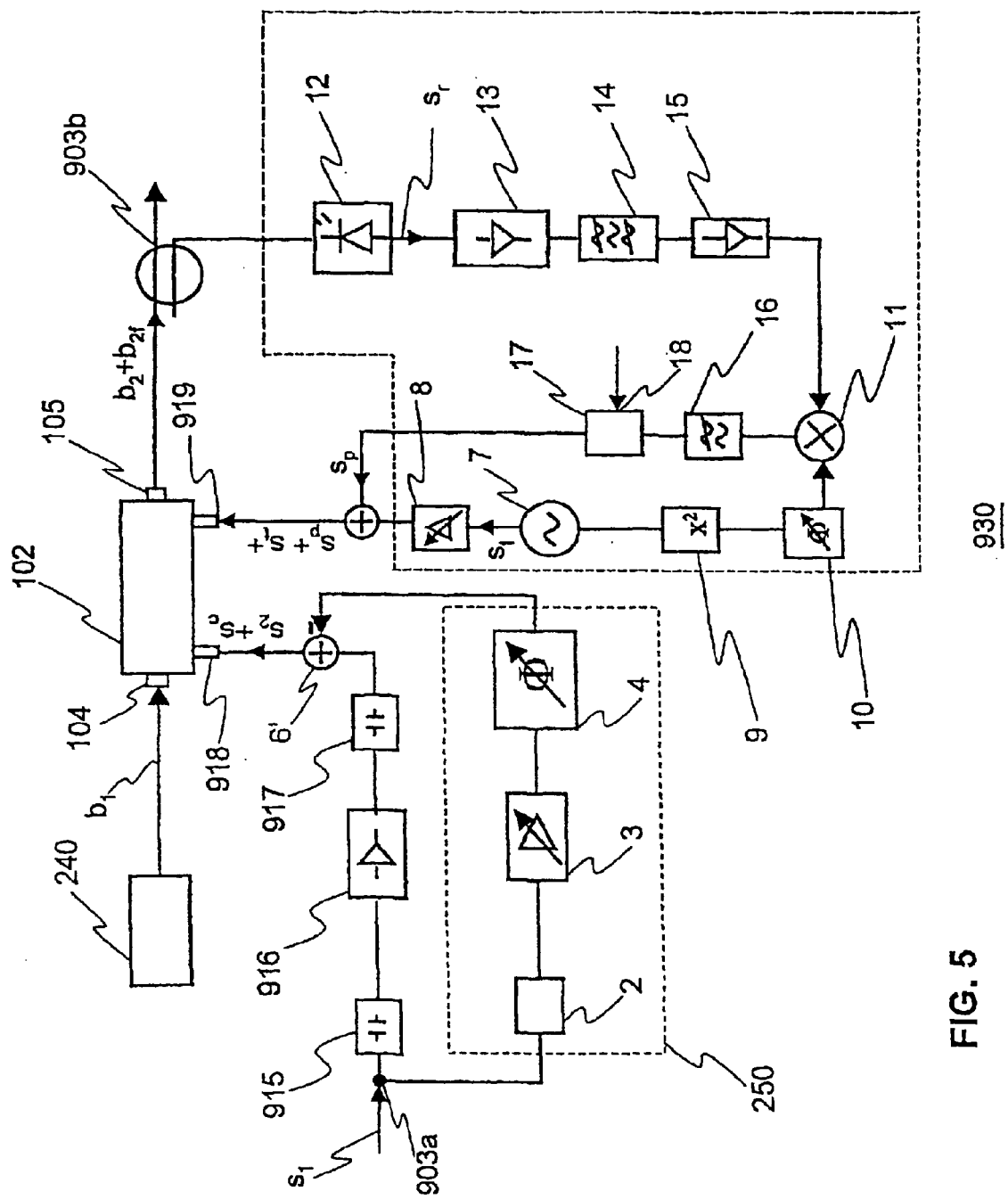
FIG. 5 shows a diagram of a second preferred embodiment of an externally modulated optical emitter according to the present invention.
Figure 6:
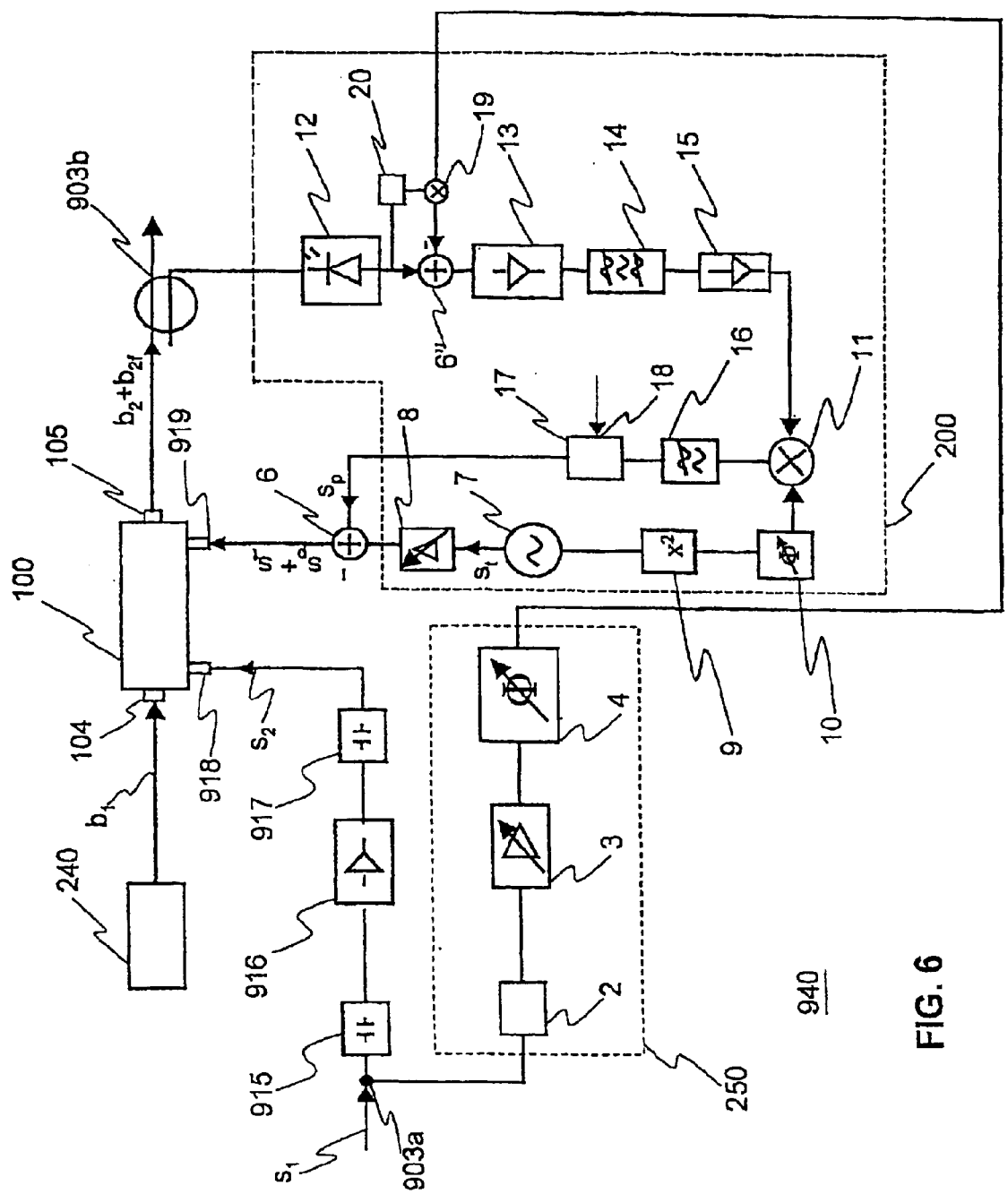
FIG. 6 shows a diagram of a third preferred embodiment of an externally modulated optical emitter according to the present invention.

The device 903 of FIG. 4 and the devices 930 and 940 of the following FIGS. 5 and 6, using the compensation circuit 250, are suitable for operation with values of $r_b$=2.488 Gbit or $r_b$=2.666 Gbit when M is greater than or equal to $2^{10}$.

For example, this first modulating electrical signal can be an FEC signal containing the SDH frame, in other words a signal having a bit rate $r_{bFEC}$=2.666 Gb/s with a word length $M_{FEC}$=($2^{13}$−1) ($2^{23}$−1). The factor $2^{23}$−1 represents a possible word length of a signal of the SDH type generated by a pseudo-random sequence generator.

The first modulating electrical signal $s_1$ reaches the amplifier stage 916 through the first decoupling capacitor 915. The first decoupling capacitor 915 cuts off the low-frequency components of the first modulating signal.

After being filtered in this way, the first modulating signal is suitably amplified by the amplifier stage 916 and is then applied to the second decoupling capacitor 917, which eliminates the direct-current component and the components at low frequency, for example those below 30 kHz.

At the output of the second decoupling capacitor 917 there is advantageously a second modulating signal $s_2$, whose amplitude spectrum does not have components at frequencies lower than the cut-off frequency $f_t$ of the circuit comprising the first decoupling capacitor 915, the amplifier stage 916, and the second decoupling capacitor 917, or of the protective capacitor 123.

The elimination of the low-frequency spectral components of the modulating signal does not entail a significant degradation of the performance of the modulation.

The second modulating signal $s_2$ is applied to the RF port 918 of the electro-optical modulator 100.

In the electro-optical modulator 100, the optical carrier signal $b_1$ is modulated by the second modulating signal $s_2$, as described above, generating a modulated optical signal $b_2$ at the output of the electro-optical modulator 100.

The oscillator 7 generates an electrical signal, referred to hereafter as the pilot tone, $s_f$, with a known frequency $f_1$.

In particular, the frequency $f_1$ of the pilot tone $s_f$ is lower than the lower limit of the frequency band of the second modulating signal $s_2$, $f_t$.

Preferably, the frequency $2f_1$ is lower than the cut-off frequency $f_t$ equal to the lower limit of the band of the second modulating electrical signal $s_2$.

The pilot tone $s_f$ is injected, through the variable attenuator 8 and the adding node 6, into the BIAS port 919 of the electro-optical modulator 100.

Advantageously, the variable attenuator 8 makes it possible to fix the amplitude of the pilot tone $s_f$ in such a way that it is in a precise relationship with the voltage $V_\pi$, being for example 5% of $V_\pi$.

In the presence of this pilot tone $s_f$, an optical signal, comprising a component at the frequency $f_1$, the second harmonic component $b_{2f}$ at the frequency $2f_1$, and higher-order harmonics ($3f_1$, etc.), is generated at the output of the electro-optical modulator 100.

The amplitude of the harmonics of orders above the first, and particularly those of even order, increases as the operating point of the electro-optical modulator 100 moves away from the optimal operating point Q, shown in FIG. 3.

The applicant has observed that, in the case of ideal behaviour of the electro-optical modulator, and therefore on the assumption of perfect linearity of its transfer characteristic, the spectrum of the modulated optical signal $b_2$ should have the same shape as that of the second modulating optical signal $s_2$.

The applicant, as will be described in detail subsequently, has observed experimentally that, if the compensation circuit 250 is not used, the second harmonic component $b_{2f}$ may be submerged in the background noise.

In other words, the modulated optical signal $b_2$ has a spectrum which contains, in addition to the spectrum of the second modulating signal $s_2$ whose band has a lower limit at the value $f_t$, low-frequency components, in other words the said background noise which has a frequency band below $f_t$.

The applicant has observed experimentally that this background noise has a spectrum which shows lines which become denser, until they form a continuous spectrum, as the word length M increases, for a given bit rate $r_b$ of the first modulating electrical signal.

The applicant has also noted that this noise has an amplitude spectrum having a shape which reproduces that of the low-frequency amplitude spectrum of the first modulating electrical signal.

In greater detail, the spectral components of the noise are spaced apart by a value about equal to the ratio $r_b/M$ of the bit rate of the modulating signal to the word length M, in a similar way to what occurs in the spectrum of the first modulating electrical signal $s_1$, subject to gain or phase factors.

The presence of this background noise may be due to beats, particularly odd-order beats, which occur in the electro-optical modulator 100 between spectral components at high frequency, spaced apart by a quantity $r_b/M$, of the second modulating signal. These odd-order beats, or intermodulation products, are such that they reconstruct the low-frequency components of the first modulating signal. The odd-order intermodulation is due to the fact that, although the operating point of the electro-optical modulator is at the aforesaid inflection point Q (corresponding to the cancellation of even-order non-linearities), the digital type of modulation used requires the use of a portion of the input-output characteristic of the modulator which is so wide that it does not show a linear shape.

The compensation circuit 250 generates a compensation signal $s_c$ from a fraction of the first modulating electrical signal.

A fraction of the first modulating electrical signal $s_1$ is sent, through the high-pass filter 2, which cuts off its direct-current component, to the amplifier stage 3 which, in addition to bringing it to a suitable level, cuts off the high-frequency components.

By means of the optional phase shifter 4, whose function is explained in greater detail below, this fraction of the first modulating electrical signal $s_1$, filtered as stated above, is applied to the subtraction input 5 of the adding node 6 connected to the bias port 919.

Thus a compensation signal $s_c$, which has an amplitude spectrum having, subject to a gain factor, a shape equal to the low-frequency shape of the first modulating electrical signal $s_1$ and having a phase spectrum of opposite sign to that of the said second signal $s_2$, is injected into the electro-optical modulator 100.

The compensation signal $s_c$ interacts within the electro-optical modulator 100 with the modulated optical signal $b_2$, thus carrying out a further amplitude modulation of the said signal $b_2$. Since the compensation signal $s_c$ has the same amplitude as, and the opposite phase to, the noise, this further amplitude modulation results in the attenuation of the noise present in the modulated optical signal $b_2$.

It should be noted that, in the particular embodiment of the invention shown in FIG. 4, the compensation signal $s_c$ is obtained from the first modulated signal $s_1$ by means of linear processing such as filtering, amplification and a phase shift.

Because of the interaction of the compensation signal $s_c$ with the modulated optical signal, the low-frequency background noise is removed to a significant extent from the spectrum of the optical signal at the output of the electro-optical modulator 100.

Preferably, the amplitude of the said noise is attenuated by at least 10 dB. More preferably, the amplitude of the said noise is attenuated by at least 15 dB. Even more preferably, the amplitude of the said noise is attenuated by at least 20 dB.

A fraction of the optical power of the optical signal present at the optical output 105 is taken off by the optical splitter 230.

This fraction of optical power is sent to the optical receiver 12 which converts it to an electrical feedback signal $s_r$.

The electrical feedback signal $s_r$ is sent to the amplifier stage 13 and then to the bandpass filter 14 which selects a frequency band comprising the second harmonic $2f_1$.

This signal is multiplied in the analog multiplier 11 by the signal obtained from the oscillator 7, and its frequency is doubled by the doubler 9.

The output of the analog multiplier 11 consists of a direct-current component and a second-order beat of the signals entering the said multiplier.

This beat is substantially eliminated by means of the low-pass filter 16.

The value of the direct-current component depends on the deviation of the bias signal $s_p$ from its optimal value, since it depends on the amplitude of the second harmonic $b_{2f}$ present in the signal at the output of the electro-optical modulator 100.

The signal leaving the low-pass filter 16 enters the differential amplifier 17 which compares it with a reference signal 18 The differential amplifier 17 supplies a bias signal $s_p$ having a level such that it causes the electro-optical modulator 100 to operate at the optimal operating point Q.

The applicant has observed that the use of the compensation circuit 250 advantageously eliminates the presence, at the input of the bandpass filter 14, centred on the frequency of the second harmonic $2f_1$, of the background noise which might otherwise, if taken off by the bandpass filter 14, saturate the amplifier 15, or at least cause a fluctuation of the signal leaving the amplifier 15 and consequently of the bias signal $s_p$.

The applicant has also observed that, in the absence of the compensation circuit 250, the fluctuations of the signal leaving the amplifier 15, due to the noise correlated with the first modulating electrical signal, reach the low-pass filter 16, which has a cut-off frequency such that it does not eliminate these fluctuations.

Since the low-pass filter 16 typically has a cut-off frequency of the order of a few hertz, it has a time constant on which the total time constant of the bias point control circuit 200 depends. A lowering of the cut-off frequency of this low-pass filter, to values of the order of hundreds of mHz for example, with the aim of eliminating the fluctuations caused by the said noise, would lead to an increase in the time constant of the low-pass filter 16 and in the total time constant of the control circuit 200.

The applicant has noted that such an increase in the total time constant of the control circuit 200 would limit the dynamic range of this circuit, causing problems in the control of rapid variations of the operating point, such as those, for example, due to thermal shocks or resulting from strong transient disturbances of the data signal.

The applicant has also noted that an increase in the time constant of the low-pass filter 16 makes the operation of calibrating the control circuit 200 more time-consuming or even impossible. This operation is carried out by imparting a variation to the reference signal 18 applied to the differential amplifier 17, and evaluating the response of the electro-optical modulator. A time constant of the low-pass filter 16 of the order of hundreds of mHz produces a response time which is so high, at 10–15 s, that this calibration becomes rather difficult.

The compensation circuit 250 of the device in FIG. 4 is calibrated by connecting the other output of the optical splitter 230 to an optical receiver, such as a photodiode, and then to a spectrum analyser.

The spectrum of the modulated optical signal at the output of the electro-optical modulator 100 is observed in the absence of a compensation circuit 250, and then the compensation circuit 250 is connected and the variable-gain amplifier 3 is adjusted until the compensation described above is optimized and a feedback signal at the second harmonic frequency which has a sufficient reduction of the amplitude of the background noise is obtained.

The optional phase shifter 4 is inserted into the compensation circuit 250 with the object of compensating for any phase differences introduced into the compensation signal $s_c$.

The applicant has observed experimentally that these phase differences occur with an electro-optical modulator of the type 101 which has a single electrical structure for the BIAS electrode and for the RF electrode.

In this case, during the step of calibration of the circuit 250, the phase shifter 4 and variable amplifier 3 are adjusted in such a way as to cancel the noise, at least in a frequency band used by the control circuit 200.

In a second particular embodiment of the invention, an electro-optical modulator 102, described with reference to FIG. 2, is used.

In this case, the compensation signal $s_c$ can be applied not only to the BIAS port 919 as described above, but also to the RF port 918.

In relation to this, FIG. 5 shows an optical emitter 930 comprising the electro-optical modulator 102, and an adding node 6' inserted between the output of the decoupling capacitor $C_2$ and the RF port 918.

In FIG. 5, components of a similar type to those illustrated in FIG. 4 are indicated by the same numerical references.

The compensation circuit 250 is connected to a subtraction input of this adding node 6'.

The compensation signal $s_c$ leaving the compensation circuit 250 connected via the adding node 6' to the RF port 918 is propagated from the RF electrode 128 towards the hot electrode 130, enabling the noise present in the modulated optical signal $b_2$ to be modulated in a similar way to that described previously.

The operation of the optical emitter of FIG. 5 is similar to that described with reference to FIG. 4, and will be clear from the preceding description to the person skilled in the art.

The compensation signal $s_c$ can be applied to the RF port 918 of the electro-optical modulator whenever the RF electrode does not comprise filtering elements which would impede its transmission towards the hot electrode.

Additionally, the present invention is also applicable advantageously to the case in which the first modulating signal $s_1$ is applied directly to the RF port 918 of an electro-optical modulator of the type 102, without undergoing the filtering which eliminates its low-frequency components.

For example, with reference to FIG. 5, we shall consider an optical emitter for which the electrical series comprising the first decoupling capacitor 915, the amplifier stage 916 and the second decoupling capacitor 917 is absent or is such that it has a cut-off frequency which does not block the low-frequency components of the signal applied to the port 903$a$.

In this embodiment of the invention, the compensation signal can be applied to the RF port 918 shown in FIG. 5 or to the BIAS port 919, as shown in FIG. 4.

In this case, adjustment of the amplifier stage 3 produces a compensation signal $s_c$ having an amplitude such that it compensates both the said noise and the low-frequency components which are present in the modulated optical signal $b_2$ and correspond to those of the first modulating electrical signal. In this case, the amplitude of the compensation signal $s_c$ is greater than that required for the compensation of the noise only.

FIG. 6 shows an alternative embodiment of the invention, comprising an optical emitter 940, in which the compensation circuit 250 is connected to an analog multiplier 19 connected electrically to a subtraction input of an adding node 6" interposed between the output of the optical receiver 12 and the input of the amplifier stage 13.

The analog multiplier 19 is also connected by another of its inputs to a low-pass filter 20 connected to the output of the optical receiver 12.

The low-pass filter 20 is capable of supplying at its output a direct-current electrical signal whose amplitude is correlated with the mean power of the electrical signal leaving the optical receiver 12; this filter is, for example, a conventional RC filter.

The analog multiplier 19 is advantageously capable of supplying to the adding node 6" an electrical signal whose amplitude is equal to the product of the signal leaving the compensation circuit 250 and the direct-current signal leaving the low-pass filter 20.

An example of a multiplier suitable for this purpose is the MPY634 model, produced by BURR-BROWN (USA).

The other devices used in the optical emitter 940 are of the same type as those described previously, and are therefore indicated by the same numerical references and will not be described further.

The operation of the bias point control circuit 200, and the modulation of the carrier signal, take place in a way similar to that illustrated with reference to the emitter 903.

The noise regenerated by the electro-optical modulator 100 is reduced in the following way.

A fraction of the power of the optical signal present at the output 105 is taken off by the optical splitter 230, and is converted to an electrical signal by means of the optical receiver 12.

As mentioned above, noise with a spectrum whose shape reproduces that of the low-frequency spectrum of the first modulating signal may be present in the frequency band of the modulated optical signal $b_2$, comprising the second harmonic $2f_1$.

As described above, the compensation circuit 250 supplies a signal having an amplitude spectrum with a shape identical to that of the noise. This signal is added with opposite phase, by means of the node 6", to the feedback signal, thus attenuating the noise.

This enables the bias point control circuit 200 to operate correctly.

The low-pass filter 20 and the analog multiplier 19 advantageously enable the level of the amplitude spectrum of the compensation signal to be matched automatically to the variations of mean level of the feedback signal. In greater detail, the power of the modulated optical signal may vary either because of undesired instabilities in the source 240 or because of attenuation or amplification produced by suitable optical attenuators or amplifiers located at the output 105 of the electro-optical modulator 100.

These variations of the power of the modulated optical signal correspond to variations of the power of the electrical feedback signal $s_r$ present at the output of the optical receiver 12. The amplitude of the direct-current signal leaving the low-pass filter 20 varies according to the fluctuations of the power of the electrical feedback signal $s_r$.

The analog multiplier 19 multiplies this direct-current signal by that leaving the compensation circuit 250, thus producing an electrical compensation signal $s'_c$ whose amplitude is correlated with the power of the said electrical feedback signal $s_r$.

The electrical compensation signal $s'_c$ is subtracted from the electrical feedback signal $s_r$ entering the adding node 6", thus producing the attenuation of the noise.

The advantages of the present invention will be made clearer by the following experiments conducted by the applicant.

Experiment 1

Figure 7:
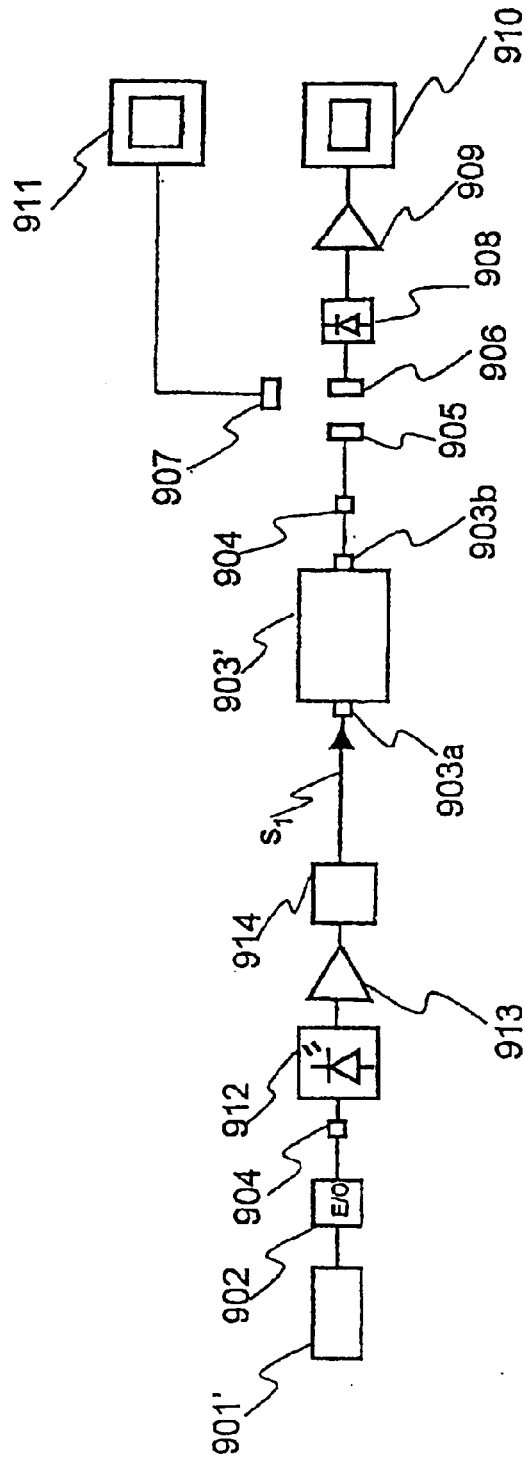
FIG. 7 shows a first experimental set-up using an optical emitter according to the invention and a pseudo-random sequence generator.

The set-up which was used, shown in FIG. 7, comprised a pseudo-random bit sequence generator (PRBS) 901', connected electrically to an electro-optical converter 902 whose optical output was connected to an avalanche photodiode (APD) 912 for the optical-electrical conversion.

The avalanche photodiode 912 was connected to an amplifier 913 and to a data clock recovery unit 914 connected to the input 903a of the optical emitter 903'.

A suitable optical attenuator 904 was located between the electro-optical converter 902 and the avalanche photodiode 912.

The output 903b of the optical emitter 903' was connected by an optical fibre provided with an optical attenuator 904 to a connector 905.

This connector 905 was capable of being connected to a connector 906 or to a connector 907.

The connector 906 was connected to a photodiode 908 connected, through a conventional transimpedance amplifier 909, to a spectrum analyser 910.

The connector 907 was connected to a sampling oscilloscope 911.

The PRBS 901' used was a "Pulse Pattern Generator" made by Anritsu, model MP 1650A, capable of producing sequences of bits at bit rates from 0.05 to 3 GHz; in particular, a bit rate of 2.488 Gbit/s was used for the present experiment.

The electro-optical converter 902, of conventional type, comprised a driver and a laser diode.

The photodiode 908 used was made by New-Focus, while the spectrum analyser 910 was a "Low Frequency Spectrum Analyzer" made by Hewlett Packard, model HP 3589A, with a frequency band of 10 Hz–150 MHz.

The sampling oscilloscope 911 was a "Digital Communication Analyzer" made by Hewlett Packard, model HP83480A.

The optical emitter 903' was similar to that described with reference to FIG. 4.

The input 903a was connected, through the first decoupling capacitor 915 with a capacitance of $C_1$=100 nF, to an amplifier stage 916, consisting of a "Modulator Driver" 916 (produced by NTT Electronics Corporation, model NLG4901P) having an impedance of 50Ω, which was connected by means of the second decoupling capacitor 917, with a capacitance of $C_2$=100 nF, to the RF port 918 of the electro-optical modulator 102. The cut-off frequency $f_t$ of this circuit, between the port 903a and the RF port 918, was about 30 kHz.

The modulator 102 used in the experiment and described schematically with reference to FIG. 2 was an electro-optical modulator produced by the applicant.

The BIAS port 919 was connected to the adding node 6, while the optical output 105 of the electro-optical modulator 102 was connected to an optical splitter 230 of the fused fibre type.

The said optical splitter 230 was connected optically to the control circuit 200 described previously with reference to FIG. 4.

The bandpass filter 14 capable of filtering the second harmonic component, included in the bias point control circuit 200 and shown in FIG. 4, was centred in the vicinity of the frequency of 2 kHz and had a bandwidth extending from about 100 to 200 Hz.

A switch 920, enabling the compensation circuit 250 to be connected to or disconnected from the adding node 6, was placed between the adding node 6 and the compensation circuit 250.

The modulator 102 was capable of modulating the optical carrier signal $b_1$, generated by a laser 240, in the presence of a second modulating electrical signal $s_2$ applied to the RF port 918. The laser 240, used in the present experiment, was a DFB laser capable of generating an optical beam at a typical wavelength of optical telecommunications systems, for example a wavelength in the range from 1520 nm to 1602 nm.

The operation of the set-up of FIG. 7 was as follows.

The sequence of bits generated by the PRBS 901' was converted to an optical signal by the converter 902 and sent to the avalanche photodiode 912.

The avalanche photodiode 912 converted the optical signal to an electrical signal which was amplified by the amplifier 913 and transmitted to the data-clock recovery unit 914 which recovered its timing.

The first modulating electrical signal si was present at the output of the clock recovery unit 914, and was sent to the input 903a and then to the first decoupling capacitor 915, and then to the Modulator Driver 916 which raises its level to a value suitable for driving the electro-optical modulator 102.

The signal leaving the Modulator Driver 916 was sent to the RF port 918 of the electro-optical modulator 102 through the decoupling capacitor 917 which, in the particular experiment which was conducted, cut off the spectral components of the signal having frequencies below about 30 kHz.

The electro-optical modulator 102 amplitude modulated the optical carrier signal $b_1$ arriving from the laser 240, in the presence of the second modulating electrical signal $s_2$, applied to the RF port 918, thus generating a modulated optical signal $b_2$.

The control circuit 200, as described above, generated the pilot tone $s_p$, in particular at the frequency $f_1$ equal to about 1 kHz, and the bias signal $s_p$, formed from the detection of the said second harmonic component at the frequency $2f_1$, equal to 2 kHz in the present experiment. These signals were both injected through the adding node 6 into the BIAS port 919.

Using the PRBS 901', the applicant generated sequences of bits having different lengths M, of $2^7-1$, $2^{15}-1$, $2^{23}-1$, $2^{31}-1$, and a bit rate $r_b$=2.488 Gb/s, and applied these sequences, converted to optical signals, to the port 903c of the optical emitter 903'.

With the sampling oscilloscope 911 connected by the connector 907 to the connector 905, the applicant observed the signal leaving the optical emitter 903' in the case in which the switch 920 was open, in other words when the compensation circuit 250 was not used.

For sequences with a length $M=2^{31}-1$, the applicant noted fluctuations of the corresponding image on the sampling oscilloscope 911.

Using the spectrum analyser 910, the applicant also observed the spectrum of the output signal of the optical emitter 903', with the connector 906 connected to the connector 905.

The output signal from the optical emitter 903' was converted to an electrical signal by the photodiode 908 and suitably amplified by the amplifier 909.

Figure 9A:
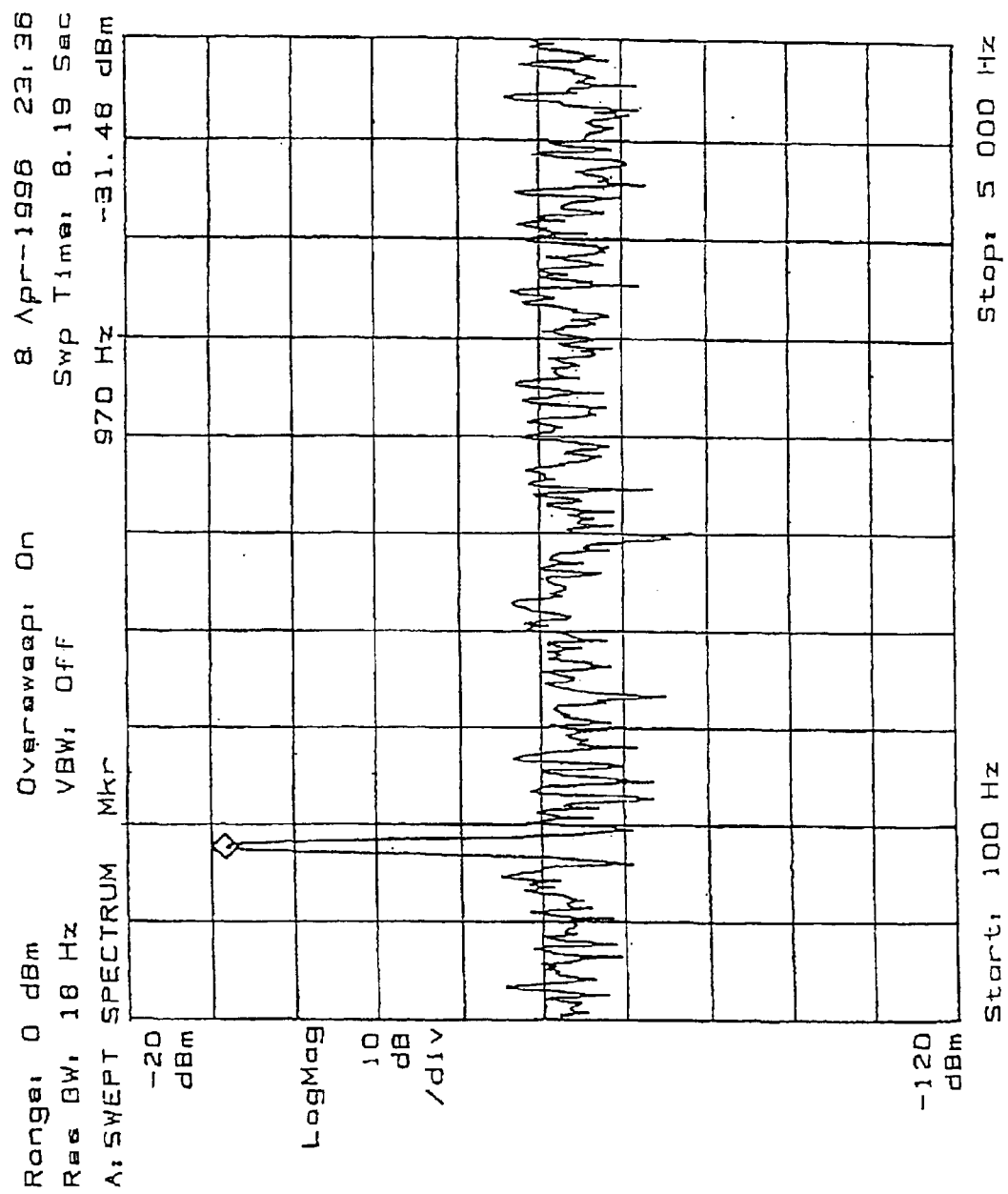
FIG. 9a shows the spectrum of the output signal of the optical emitter of FIG. 7 in response to a first sequence of bits when no compensation circuit is present.

FIG. 9a shows the spectrum, from 100 Hz to 5 kHz, observed at the spectrum analyser 910 in the presence of random sequences having a length $M=2^{31}-1$.

This figure shows a peak of about −30 dBm, corresponding to the pilot tone sf, at the frequency of about 970 Hz, and a background noise having a mean level of about −70 dBm.

The second harmonic component, at the frequency of about 2 kHz, used to generate the bias signal $s_p$, is submerged in this background noise.

The applicant has noted that the bandpass filter 14, having a bandwidth extending from 100 to 200 Hz, does not discriminate the second harmonic component at 2 kHz, which may have an amplitude of about 50–60 dB less than the peak at 1 kHz due to the pilot tone, from the background noise.

The noise contained in the frequency band of the low-pass filter 14 reaches the control circuit 200 and causes a fluctuation of the bias signal $s_p$ or the saturation of the amplifier stage 15 of the bias point control circuit 200.

These fluctuations correspond to the oscillations of the image of the sampling oscilloscope 911 mentioned above.

The applicant observed that the oscillations of the operating point of the electro-optical modulator may, in extreme conditions, also cause fluctuations of the probability of error, BER (bit error rate), at the receiver.

The applicant then observed the spectrum of the signal leaving the emitter 903' in the presence of random sequences of bits having a length $M=2^{23}-1$ and a bit rate rb=2.488 Gb/s.

The first modulating electrical signal $s_1$, applied to the port 903a of the optical emitter 903', corresponding to the said sequence of bits shows, as described previously, a spectrum having peaks spaced apart, in terms of frequency, by a value equal to the frequency of repetition of the word, that is to say $r_b/M=2.488\ 109/(223-1)$ Hz≈300 Hz.

Figure 10A:
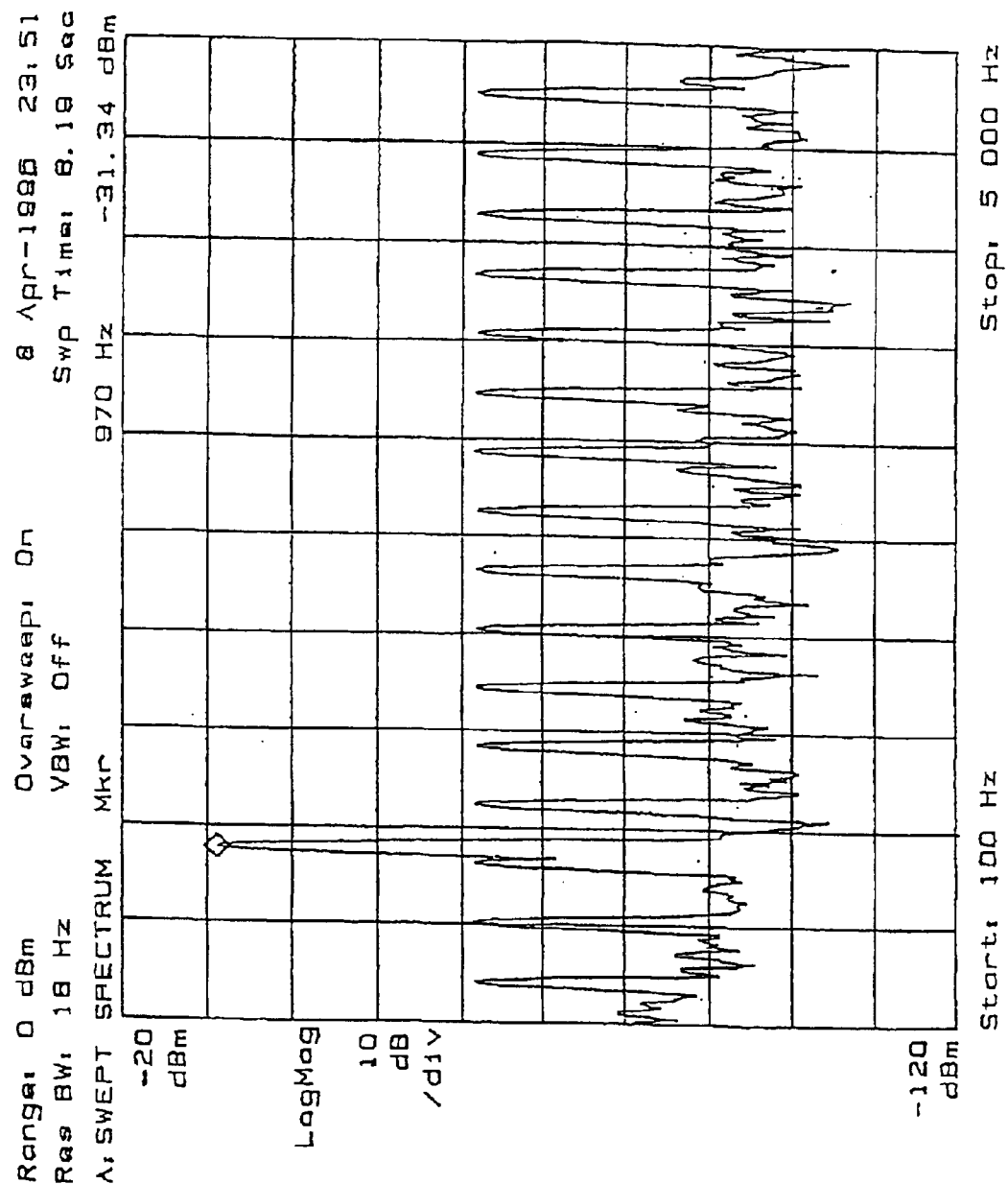
FIG. 10a shows the spectrum of the output signal of the optical emitter of FIG. 7 in response to a second sequence of bits when no compensation circuit is present.

This spectrum, observed on the analyser 910, is shown in FIG. 10a.

In addition to the tone at 1 kHz, we may note a noise which has peaks of amplitude larger than those of the noise shown in FIG. 9a; in particular, these peaks have a maximum amplitude of about −50 dBm and are spaced apart by about 300 Hz.

The applicant has observed that the noise spectrum shows the same shape, characterized by peaks spaced apart by about 300 Hz, of the spectrum of the first modulating signal $s_1$.

The applicant considers that for $M=2^{23}-1$ the distance between the observed lines is such that the second harmonic component can be discriminated with a suitable filter.

However, for a length $M=2^{23}-1$, if the second harmonic at 2 kHz were superimposed on a spectral line there would undoubtedly be a saturation of the amplifier stage 15 of the bias point control circuit 200.

Experiment 2

Figure 11:
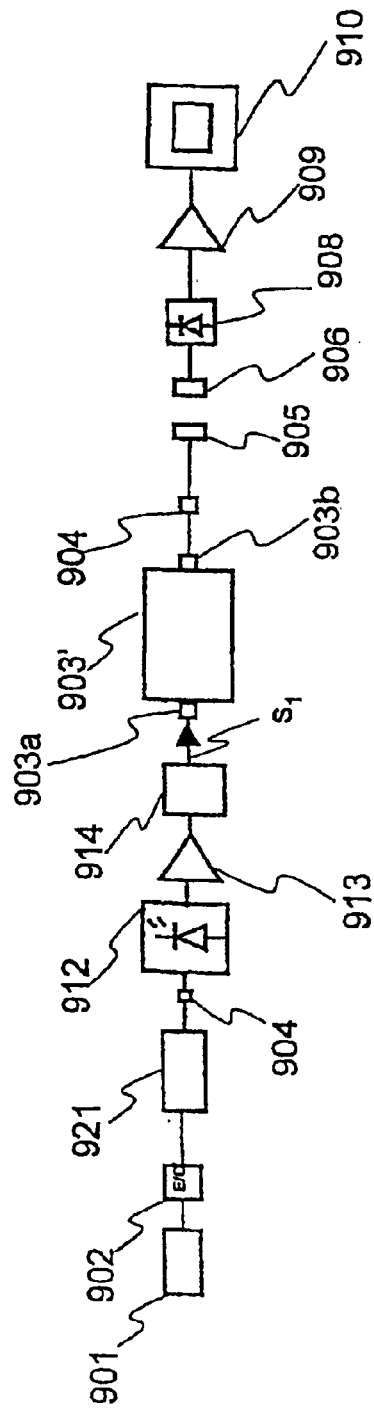
FIG. 11 shows a second experimental set-up using the optical emitter of FIG. 8 and a signal generator with FEC coding.

The applicant also analysed the output of the optical emitter 903' with the presence of an FEC frame taken into account, by using the set-up shown in FIG. 11.

The set-up shown in FIG. 11 comprises an SDH signal generator 901, connected to an electro-optical converter 902 followed by a transponder with FEC encoding 921.

The output of the transponder with FEC encoding 921 was connected to the avalanche photodiode 912 whose electrical output was connected to an amplifier 913 and to a data clock recovery unit 914 connected to the input 903a of the optical emitter 903'.

The output 903b of the optical emitter 303' was connected to the photodiode 908 and then, through the amplifier 909, to the spectrum analyser 910.

The SDH signal generator 901 which was used was an "Advanced Network Test" model made by Wandel and Goltermann.

The transponder with FEC encoding 921 which was used was produced by Pirelli-Quante.

The other components shown in FIG. 12 are the same as those used for Experiment 1 described above, and are therefore indicated by the same numerical references.

In particular, for this experimental test, the applicant kept the switch 920 open; in other words, he did not use the compensation circuit 250.

The applicant used the generator 901 to generate a sequence of bits having a length $M=2^{23}-1$, with a bit rate of 2.488 Gb/s.

This sequence of bits, after being converted to optical form in the electro-optical converter 902, was sent to the transponder with FEC encoding 921, from which it emerged with a bit rate of $r_{FEC}=2.666$ Gb/s and with a word length $M_{FEC}=(2^{13}-1)\ (2^{23}-1)$.

This optical sequence was converted to an electrical signal in the optical-electrical converter 912 which was suitably amplified in the amplifier 913.

Following the recovery of the timing, by means of the clock recovery unit 914, the first modulating electrical signal $s_1$ was generated and sent to the port 903a of the optical emitter 903'.

The first modulating electrical signal $s_1$ had a spectrum which had peaks separated in frequency by a distance of $R_{FEC}/M_{FEC}=2.666\ 109/(2^{13}-1)\ (2^{23}-1)$ Hz=38 mHz.

Figure 12A:
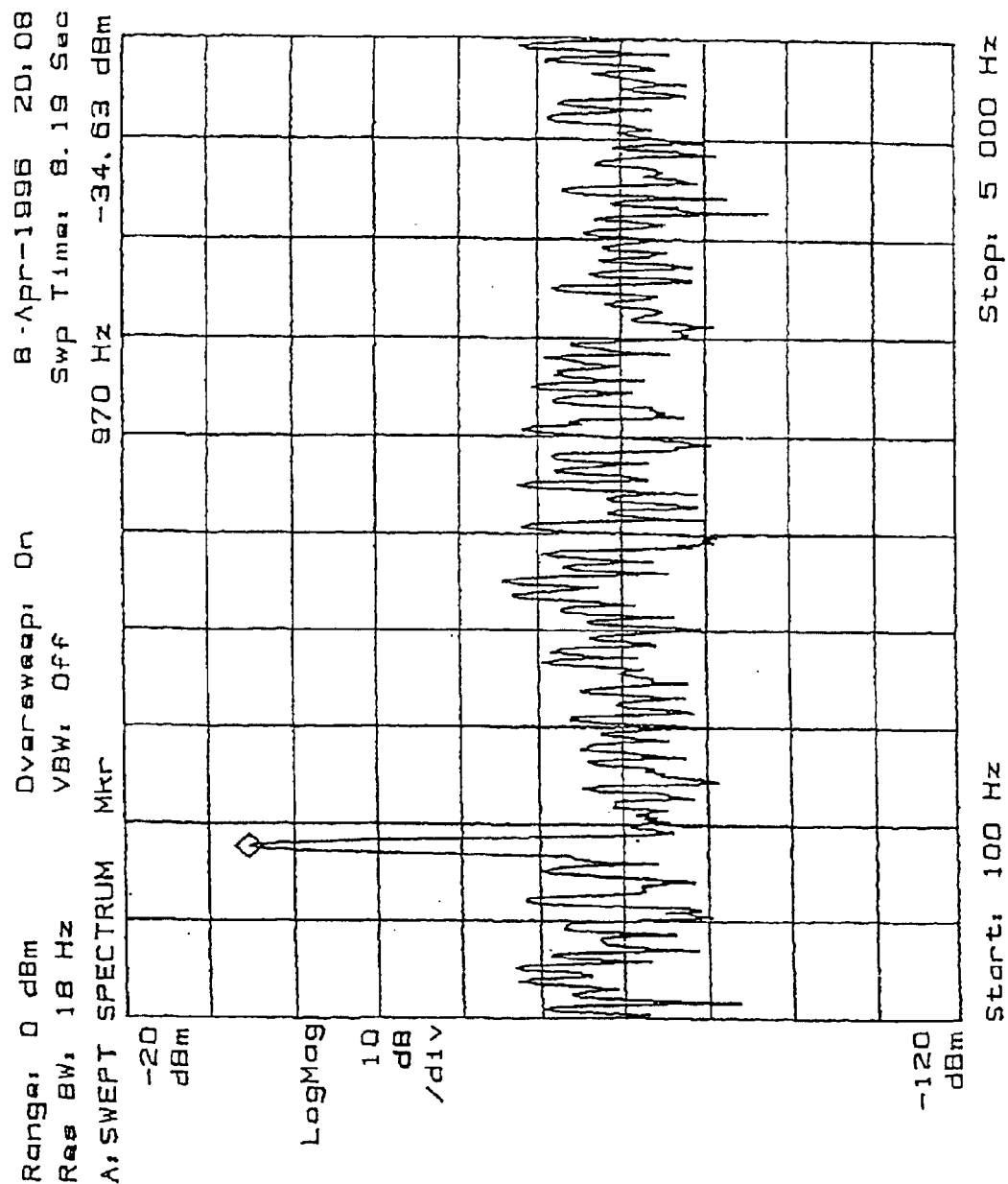
FIG. 12a shows the spectrum of the output signal of the optical emitter of FIG. 11 in response to a third sequence of bits when no compensation circuit is present.

FIG. 12a shows the spectrum of the signal present at the output 903b of the optical emitter 903' observed at the spectrum analyser 910.

In addition to the tone at the frequency $f_1$, we may note a background noise similar to that of FIG. 9a, which gives rise to the aforementioned problems of fluctuation of the bias signal and the possibility of saturation of the amplifier 15 contained in the control circuit 200.

Experiment 3

Figure 8:
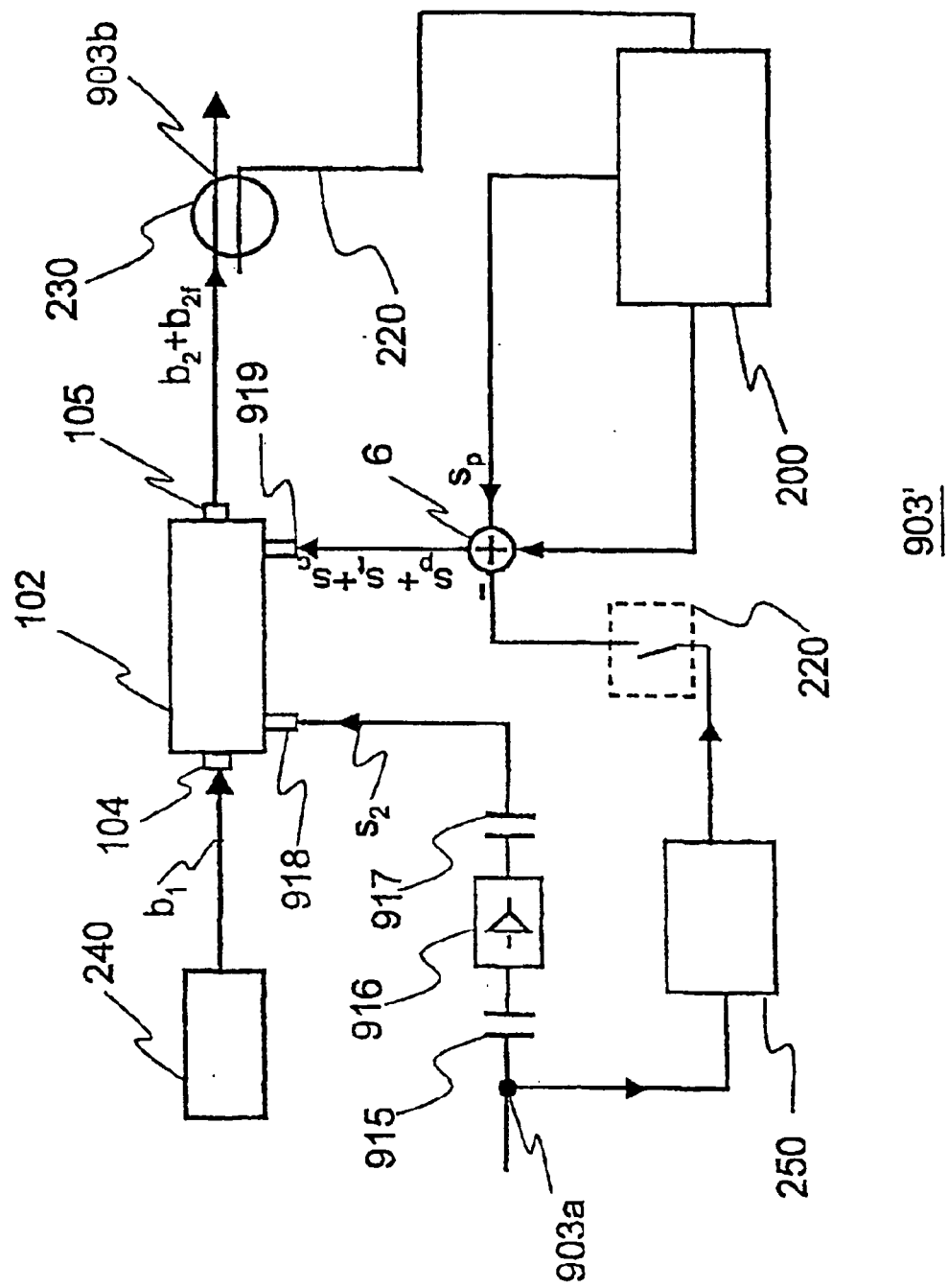
FIG. 8 shows a detailed diagram of the optical emitter used in the experimental set-up of FIG. 7.

The applicant then measured the spectrum of the optical signal modulated by the same sequences of bits as those of Experiments 1 and 2, but using, in this case, the compensation circuit 250, in other words closing the switch 920 of FIG. 8.

The set-ups described above were used for making these measurements.

In particular, the compensation circuit 250 had a high-pass filter 2 comprising a resistor having a resistance of 1 kΩ and a capacitor having a capacitance of 1 μF, connected in series in such a way as to form a high-pass filter capable of cutting off components at frequencies below 159 Hz.

Additionally, the high-impedance amplifier stage 3 had an impedance of more than 1 MΩ, and was capable of cutting of the spectral components above about 10–20 kHz.

Figure 9B:
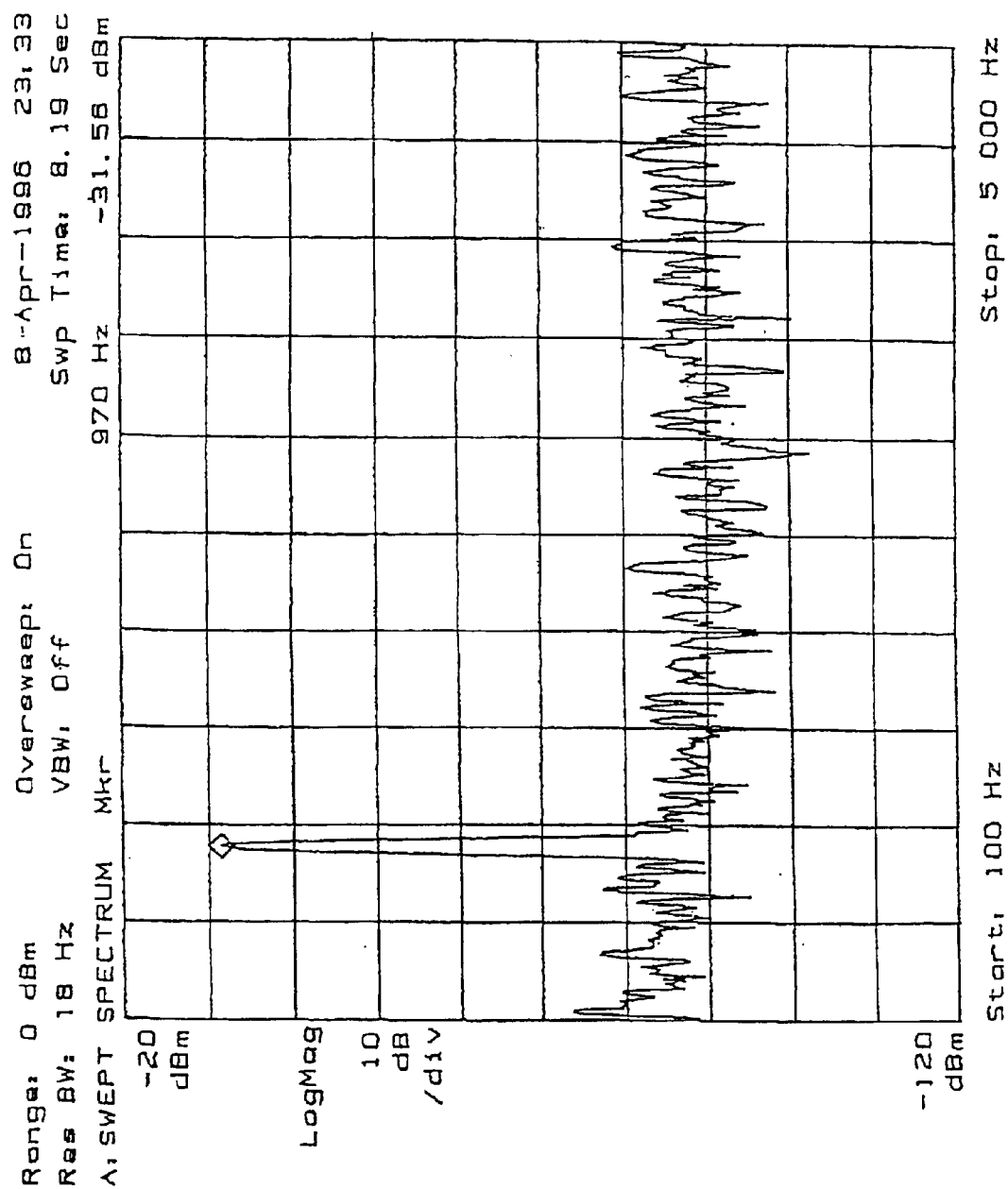
FIG. 9b shows the spectrum of the output signal of the optical emitter of FIG. 7 in response to a first sequence of bits when a compensation circuit is present.

FIG. 9b shows the spectrum of the signal leaving the optical emitter 903' for sequences of bits applied to the RF port 918 with a length M=2³¹–1.

In this figure we may note the peak at 1 kHz relating to the pilot tone, and we may also observe that the level of the noise is much lower than that of FIG. 9a.

In particular, in the vicinity of 2 kHz, the noise is decreased by about 20 dB with respect to that of FIG. 9a which corresponds to the case in which the compensation circuit 250 was not used.

Moreover, observation with the sampling oscilloscope 911 revealed no fluctuations of the image, in other words fluctuations of the eye diagram of the oscilloscope.

The reduction of the noise level makes it possible to obtain a second harmonic component at 2 kHz which can be discriminated more easily from the noise.

The second harmonic component at 2 kHz is not visible in FIG. 9b, because it is made negligible by the correct action of the control circuit 200 and by the attenuation of the background noise.

The applicant also analysed the spectrum of the optical signal leaving the optical emitter 903' in the presence of sequences of bits having a length M=2²³–1.

Figure 10B:
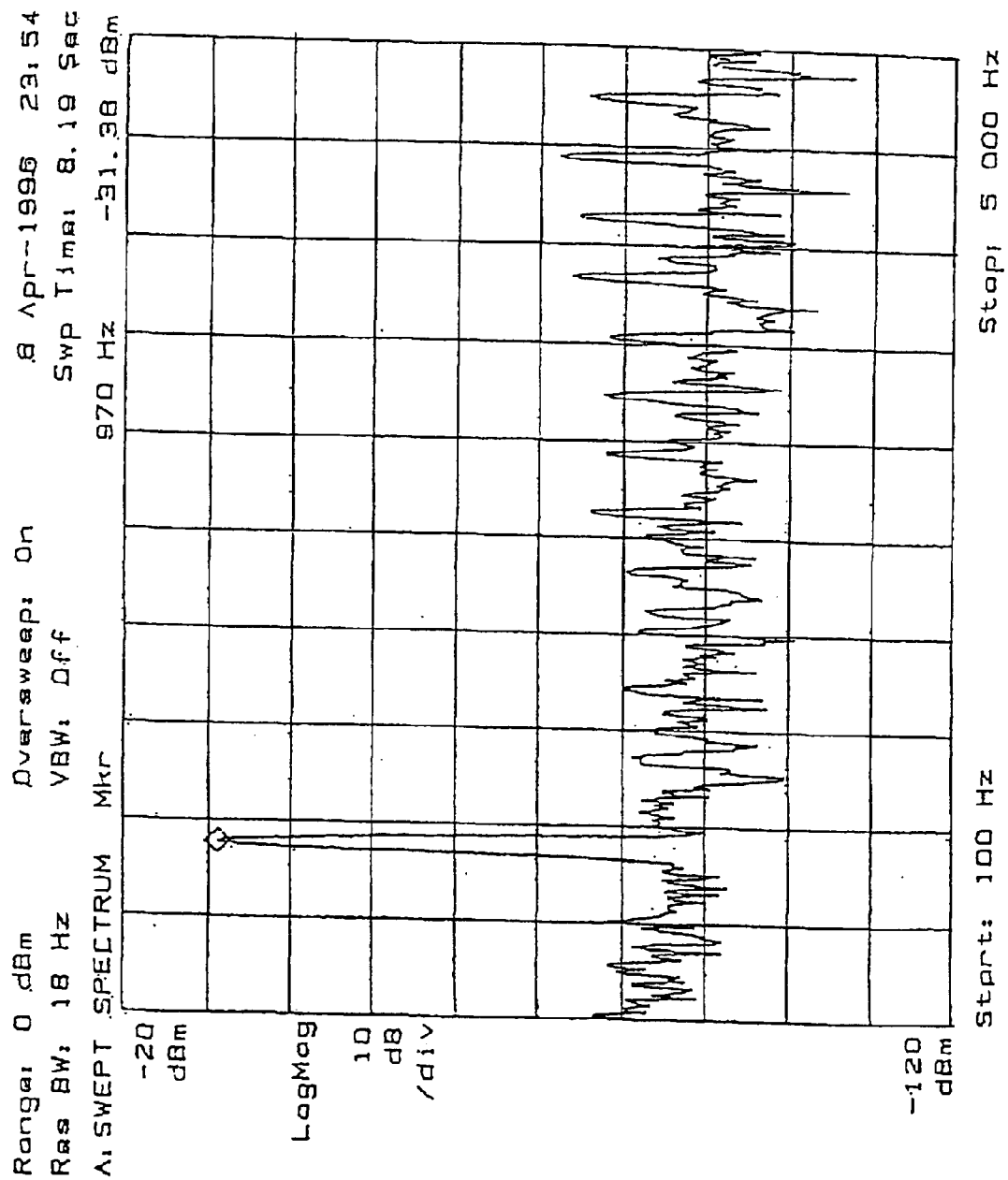
FIG. 10b shows the spectrum of the output signal of the optical emitter of FIG. 7 in response to a second sequence of bits when a compensation circuit is present.

In FIG. 10b, which shows this spectrum, it may be noted that the noise is attenuated by more than 20 dB when the compensation circuit 250 is used.

Using the circuit of FIG. 11, the applicant also analysed the spectrum of the signal leaving the optical emitter 903' when modulated by sequences of bits containing the FEC frame.

Figure 12B:
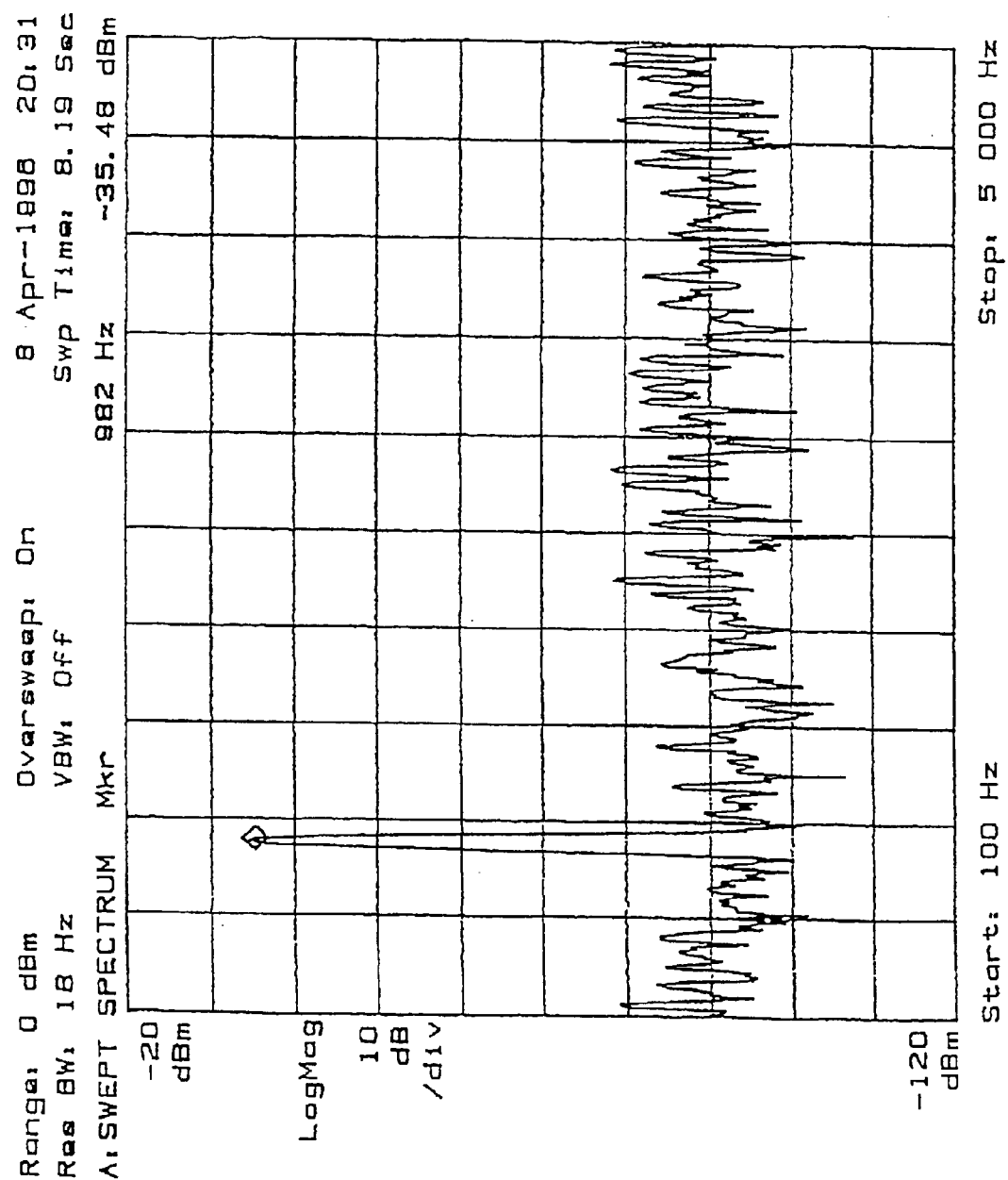
FIG. 12b shows the spectrum of the output signal of the optical emitter of FIG. 11 in response to a third sequence of bits when a compensation circuit is present.

FIG. 12b shows the spectrum which was measured.

When FIG. 12b is compared with FIG. 12a for the same modulating electrical signal, it may be noted that the noise in the vicinity of 2 kHz is reduced by about 10–15 dB when the compensation circuit 250 is present.

In FIGS. 9a and 12a, which show the spectra of the optical signal leaving the optical emitter 903' in the presence of an SDH signal with a word length M=2³¹–1 and an FEC signal respectively, no background noise is seen, and it is not possible to distinguish peaks spaced apart by $r_b/M=2.488 \cdot 10^9/2^{31}-1=1.15$ Hz and by $r_{FEC}/M_{FEC}=2.666 \cdot 10^9/(2^{13}-1)(2^{23}-1)$ Hz=38 mHz respectively.

This is due to the fact that the optical receiver 908, which has a resolution of 18 Hz, cannot be used to discriminate between spectral lines which are too densely packed.

What is claimed is:

1. Externally modulated optical emitter, comprising:
   an optical source capable of generating an optical carrier signal;
   an electro-optical modulator capable of receiving a modulating electrical signal and a bias signal, the said modulator comprising:
     an optical input for an optical carrier signal generated by the said source,
     at least one electrical input,
     an optical output for a modulated optical signal;
   an optical-electrical receiver coupled to the said optical output, capable of converting at least a portion of modulated optical signal into an electrical feedback signal and of making it available at an electrical output;
   a circuit for controlling the operating point of the electro-optical modulator, connected to the said output of the optical receiver for generating the said electrical bias signal from the said electrical feedback signal;
   a compensation circuit for generating a compensation signal capable of interacting with the modulated optical signal, the said compensation circuit comprising:
     an input terminal for taking a fraction of the said modulating electrical signal before it is supplied to the said electrical input,
     at least one phase-shifting element connected to the said input terminal to invert the phase of the said fraction of the modulating electrical signal,
     an output terminal capable of being connected to the said at least one electrical input, to obtain an interaction of the compensation signal with the said modulated optical signal,
   in which the said compensation circuit comprises at least one filtering element for eliminating predetermined spectral components from the said fraction of the modulating electrical signal, and
   in which the said at least one filtering element is capable of eliminating from the said fraction of the modulating electrical signal the spectral components located in a frequency band external to the band of the said noise.

2. Optical emitter according to claim 1, in which the said at least one filtering element comprises a low-pass filter.

3. Optical emitter according to claim 2, in which the said low-pass filter has a cut-off frequency of 10 kHz.

4. Method for generating a modulated optical signal where an optical carrier signal is supplied to an electro-optical modulator, comprising the steps of:
   a) supplying a modulating electrical signal to the said modulator to obtain the modulated optical signal,
   b) supplying an electrical drive signal to the said modulator, in such a way as to generate at the output of the said modulator an optical feedback signal, the said optical feedback signal being capable of incorporating a noise correlated with the modulating electrical signal,
   c) generating, from the said optical feedback signal, an electrical bias signal capable of biasing the modulator at an operating point dependent on the said feedback signal,
   d) processing at least one fraction of the said modulating electrical signal to obtain a compensation signal whose phase is inverted with respect to that of the modulating electrical signal,
   e) causing an interaction between a signal obtained from the said modulated optical signal and the said compensation signal to attenuate the said noise in the electrical feedback signal in such a way that the electrical bias signal is independent of the shape of the said noise.

5. Method according to claim 4, in which the said processing step is a linear processing of the said at least one fraction of the modulating electrical signal.

6. Method according to claim 4, in which the said interaction step comprises a step of supplying the said compensation signal to the said electro-optical modulator in such a way as to cause an interaction with the modulated optical signal.

7. Method according to claim 6, in which the said interaction step comprises a step of supplying the said compensation signal to an input for bias signals of the said electro-optical modulator.

8. Method according to claim 6, in which the said interaction step comprises a step of supplying the said compensation signal to an input for radio-frequency signals of the said electro-optical modulator.

9. Method according to claim 4, in which the said interaction step comprises a step of converting the said optical feedback signal to an electrical feedback signal.

10. Method according to claim 9, in which the said interaction step comprises a step of adding the said compensation signal to the said electrical feedback signal.

11. Method according to claim 10, comprising a step of modifying the amplitude of the said compensation signal in a way which is correlated with the amplitude of the electrical feedback signal.

12. Method for generating a signal having a first predetermined frequency band, comprising the steps of:
   a) supplying an optical carrier signal to an optical modulator,
   b) generating a modulating electrical signal with which are associated a first spectrum in the said first frequency band and a second spectrum in a second frequency band,
   c) supplying the said one part of the modulating electrical signal contained in the first band to the said optical modulator to generate a modulated optical signal capable of having a spectrum in the said first and second bands,
   d) taking at least one fraction of the said modulating electrical signal,
   e) linearly processing the said at least one fraction to obtain a compensation signal contained in the said second hand,
   f) causing an interaction between a signal obtained from the said modulated optical signal and the said compensation signal,
   g) selecting the relative phases of the said interacting signals in such a way as to attenuate the said second spectrum of the modulated optical signal.

13. Electro-optical modulator, comprising at least one electrical port,
   an input circuit for the application of a modulating electrical signal to the said at least one electrical port,
   a linear processing circuit capable of generating a compensation signal, having a first terminal connected to the said input circuit for taking a fraction of the said modulating electrical signal, the said linear processing circuit comprising:
      at least one filtering element for eliminating predetermined spectral components from the said fraction of the modulating electrical signal,
      at least one phase-shifting element for inverting the phase of the said fraction of the modulating electrical signal,
      a second terminal capable of being connected to the said at least one electrical port for applying the compensation signal to the said electro-optical modulator.

* * * * *